United States Patent
Hayase et al.

(10) Patent No.: US 12,187,094 B2
(45) Date of Patent: Jan. 7, 2025

(54) THERMAL MANAGEMENT SYSTEM

(71) Applicant: DENSO CORPORATION, Kariya (JP)

(72) Inventors: Tomohiro Hayase, Kariya (JP); Nobuharu Kakehashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 219 days.

(21) Appl. No.: 17/898,660

(22) Filed: Aug. 30, 2022

(65) Prior Publication Data

US 2022/0410652 A1  Dec. 29, 2022

Related U.S. Application Data

(63) Continuation of application No. PCT/JP2021/000643, filed on Jan. 12, 2021.

(30) Foreign Application Priority Data

Mar. 3, 2020  (JP) ................. 2020-035754

(51) Int. Cl.
*B60H 1/00* (2006.01)
*B60L 58/24* (2019.01)

(52) U.S. Cl.
CPC ..... *B60H 1/00271* (2013.01); *B60H 1/00885* (2013.01); *B60H 2001/00307* (2013.01); *B60L 58/24* (2019.02)

(58) Field of Classification Search
CPC ............ B60H 1/00271; B60H 1/00885; B60H 2001/00307; B60L 58/24
See application file for complete search history.

(56) References Cited

U.S. PATENT DOCUMENTS

| | | |
|---|---|---|
| 2015/0202986 A1 | 7/2015 | Hatakeyama et al. |
| 2021/0129627 A1* | 5/2021 | Kim ................... B60H 1/00278 |
| 2021/0316597 A1* | 10/2021 | Okamura ............... B60L 58/33 |
| 2022/0024279 A1* | 1/2022 | Fukui ................. B60H 1/00278 |
| 2024/0198766 A1* | 6/2024 | Xie .................... B60H 1/00271 |

FOREIGN PATENT DOCUMENTS

| | | |
|---|---|---|
| JP | H07101227 A | 4/1995 |
| JP | 2014037178 A | 2/2014 |
| JP | 2019119369 A | 7/2019 |

* cited by examiner

*Primary Examiner* — Miguel A Diaz
(74) *Attorney, Agent, or Firm* — Harness, Dickey & Pierce, P.L.C.

(57) ABSTRACT

A thermal management system includes a high-temperature side heating medium circuit, a low-temperature side heating medium circuit, a device heating medium circuit, a circuit connection portion and a circuit switch unit. The circuit switch unit switches between an operation mode in which a heating medium that passed through the low-temperature side heating medium circuit is circulated through any one of the high-temperature side heating medium circuit and the device heating medium circuit via the circuit connection portion and an operation mode in which the high-temperature side heating medium circuit, the low-temperature side heating medium circuit, and the device heating medium circuit are connected via the circuit connection portion, and the heating medium is circulated through a heat generation device, a device heat exchange unit, a heating unit, and a heater core.

11 Claims, 10 Drawing Sheets

FIRST OPERATION MODE

SECOND OPERATION MODE

THIRD OPERATION MODE

FOURTH OPERATION MODE

FIFTH OPERATION MODE

SIXTH OPERATION MODE

THERMAL MANAGEMENT SYSTEM

CROSS REFERENCE TO RELATED APPLICATION

The present application is a continuation application of International Patent Application No. PCT/JP2021/000643 filed on Jan. 12, 2021, which designated the U.S. and claims the benefit of priority from Japanese Patent Application No. 2020-035754 filed on Mar. 3, 2020. The entire disclosures of all of the above applications are incorporated herein by reference.

TECHNICAL FIELD

The present disclosure relates to a heat management system.

BACKGROUND ART

A technique of a thermal management system is applied to an electric vehicle that obtains a driving force for traveling from an electric motor. The thermal management system for an electric powered vehicle includes an air conditioner cycle, a high-temperature water loop, and a low-temperature water loop, and is configured to use waste heat generated in a motor on the high-temperature water loop and waste heat generated in an inverter on the low-temperature water loop.

SUMMARY

According to an aspect of the present disclosure, a thermal management system includes a high-temperature side heating medium circuit, a low-temperature side heating medium circuit, a device heating medium circuit, a circuit connection portion and a circuit switch unit. The circuit switch unit switches between an operation mode in which a heating medium that passed through the low-temperature side heating medium circuit is circulated through any one of the high-temperature side heating medium circuit and the device heating medium circuit via the circuit connection portion and an operation mode in which the high-temperature side heating medium circuit, the low-temperature side heating medium circuit, and the device heating medium circuit are connected via the circuit connection portion, and the heating medium is circulated through a heat generation device, a device heat exchange unit, a heating unit, and a heater core.

BRIEF DESCRIPTION OF THE DRAWINGS

The above and other objects, features, and advantages of the present disclosure will become more apparent from the following detailed description with reference to the accompanying drawings. In the accompanying drawings.

DESCRIPTION OF EMBODIMENTS

Figure 1:
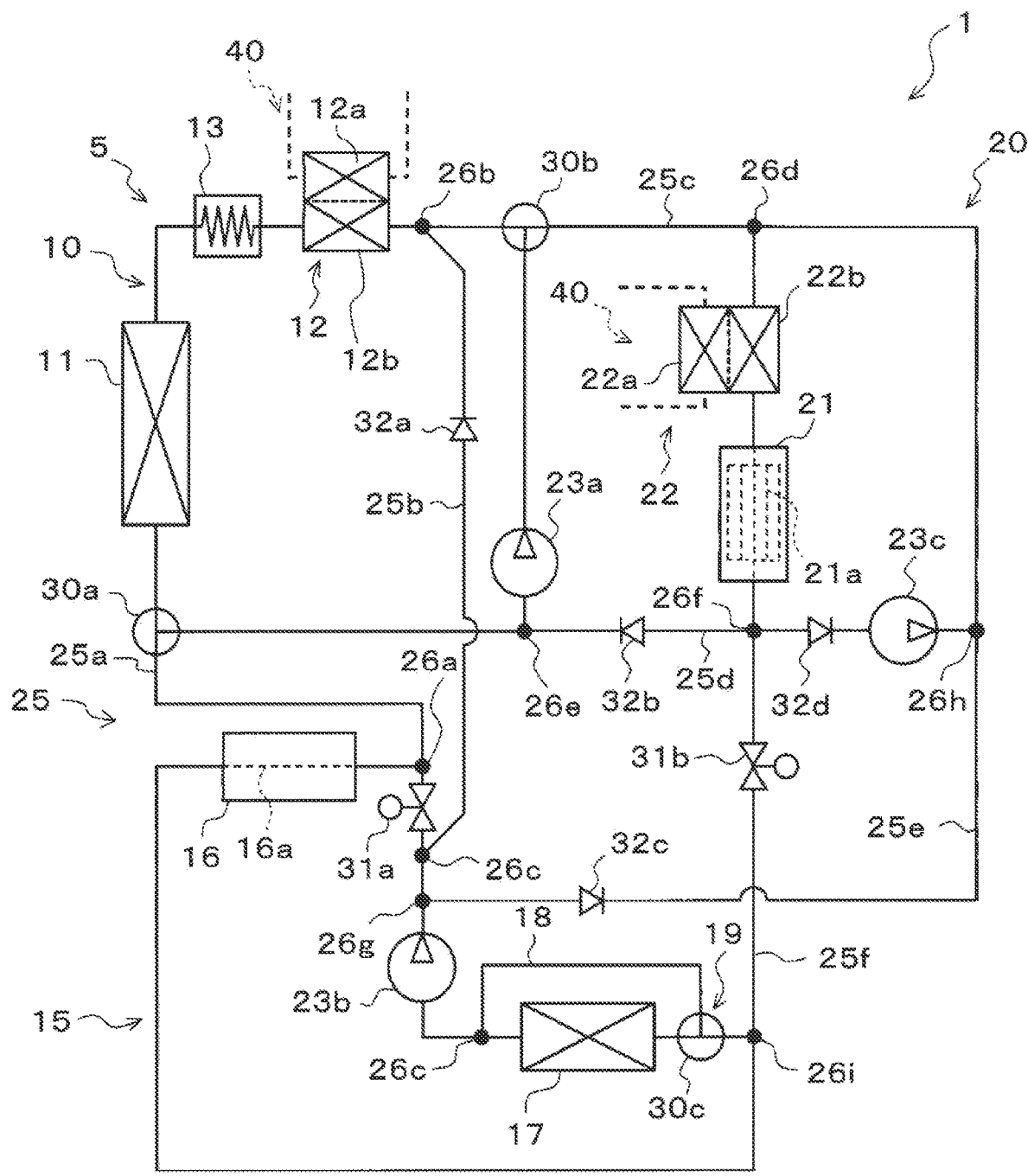
FIG. 1 is an overall configuration diagram of a thermal management system according to an embodiment.

To begin with, examples of relevant techniques will be described.

A technique of a thermal management system is applied to an electric vehicle that obtains a driving force for vehicle traveling from a traveling electric motor. The thermal management system for an electric powered vehicle includes an air conditioner cycle, a high water temperature loop, and a low water temperature loop, and is configured to use waste heat generated in a motor on a high water temperature loop side and waste heat generated in an inverter on a low water temperature loop.

The high water temperature loop and the low water temperature loop are configured as independent heating medium circuits. Therefore, when waste heat of the inverter or the battery that has absorbed heat in the low water temperature loop is to be used for heating on the high water temperature loop, it is necessary to operate the air conditioner cycle to transfer the waste heat via the refrigerant of the air conditioner cycle.

In addition, since it is necessary to exchange heat between the heating medium of the low water temperature loop and the like, and the refrigerant of the air conditioner cycle, heat loss associated with heat exchange efficiency or the like occurs when heat is transferred between the heating medium and the refrigerant. Further, when heat is transferred using the air conditioner cycle, it is necessary to operate the compressor constituting the air conditioner cycle. For this reason, when the waste heat of the heat generation device is used as the heating heat source, it is desirable to suppress the operating amount of the compressor as much as possible.

The present disclosure provides a thermal management system capable of effectively utilizing waste heat of a heat generation device.

According to an aspect of the present disclosure, a thermal management system includes a high-temperature side heating medium circuit, a low-temperature side heating medium circuit, a device heating medium circuit, a circuit connection portion and a circuit switch unit.

The high-temperature side heating medium circuit has a heating unit that heats a heating medium, a heater core that radiates heat of the heating medium to blown air blown to a space to be air-conditioned, and a first heating medium pump that pumps the heating medium, which are connected so that the heating medium is allowed to circulate therethrough.

The low-temperature side heating medium circuit has a radiator that radiates heat of the heating medium to outside air, a heat generation device that generates heat in accordance with an operation and whose temperature is adjusted by heat of the heating medium, and a second heating medium pump that pumps the heating medium, which are connected so that the heating medium is allowed to circulate therethrough.

The device heating medium circuit has a device heat exchange unit that exchanges heat between a target device to be subjected to temperature adjustment and the heating medium so that the heating medium is allowed to flow in and out. The device heat exchange unit is connected with a third heating medium pump that pumps the heating medium that the heating medium is allowed to circulate therethrough.

The circuit connection portion connects the high-temperature side heating medium circuit, the low-temperature side heating medium circuit, and the device heating medium circuit so that the heating medium is allowed to flow in and out.

The circuit switch unit switches a flow of the heating medium in the high-temperature side heating medium circuit, the low-temperature side heating medium circuit, the device heating medium circuit, and the circuit connection portion.

The circuit switch unit sets an operation mode in which the heating medium that passed through the low-temperature side heating medium circuit is circulated through any one of the high-temperature side heating medium circuit and the device heating medium circuit via the circuit connection portion.

The circuit switch unit sets an operation mode in which the high-temperature side heating medium circuit, the low-temperature side heating medium circuit, and the device heating medium circuit are connected via the circuit connection portion, and the heating medium is circulated through the heat generation device, the device heat exchange unit, the heating unit, and the heater core.

According to this configuration, in one of the operation modes, the heating medium that has passed through the low-temperature side heating medium circuit circulates via the circuit connection portion so as to pass through either one of the high-temperature side heating medium circuit and the device heating medium circuit. Therefore, the waste heat of the heat generation device in the low-temperature side heating medium circuit can be used for the heating heat source in the high-temperature side heating medium circuit or the temperature adjustment of the target device in the device heating medium circuit.

Furthermore, as one of the operation modes, the high-temperature side heating medium circuit, the low-temperature side heating medium circuit, and the device heating medium circuit are connected via the circuit connection portion, and the heating medium is circulated so as to pass through the heat generation device, the device heat exchange unit, the heating unit, and the heater core. Therefore, the waste heat of the heat generation device in the low-temperature side heating medium circuit can be used for both the heating heat source in the high-temperature side heating medium circuit and the temperature adjustment of the target device in the device heating medium circuit.

According to the thermal management system, since the waste heat of the heat generation device in the low-temperature side heating medium circuit is transferred by the circulation of the heating medium, the refrigeration cycle is not operated. Therefore, energy saving can be achieved with respect to the use of the waste heat of the heat generation device. In addition, since heat exchange with a medium other than the heating medium is not performed at the time of transferring waste heat of the heat generation device, heat loss associated with heat exchange efficiency or the like can be suppressed, and waste heat of the heat generation device can be effectively utilized.

Hereinafter, an embodiment for carrying out the present disclosure will be described with reference to the drawings.

A schematic configuration of a thermal management system 1 according to the present embodiment will be described with reference to the drawings.

The thermal management system 1 according to the present embodiment is mounted on an electric vehicle that obtains driving force for traveling from a motor generator.

In the electric vehicle, the thermal management system 1 performs air conditioning of the interior of the cabin which is a space to be air-conditioned, and performs a temperature adjustment of an in-vehicle device (for example, a heat generation device 16). That is, the thermal management system 1 is used as a vehicle air conditioner with a cooling function of an in-vehicle device in an electric vehicle. Further, the thermal management system 1 of the present embodiment adjusts the temperature of a battery 21 mounted on the electric vehicle using a heating medium circuit 5 and a refrigeration cycle 40. Therefore, the thermal management system 1 is also used as a vehicle air conditioner with a temperature adjustment function of the battery 21. The battery 21 corresponds to an example of a temperature adjustment target device.

The heat generation device 16 in the present embodiment includes a plurality of component devices. Specific examples of the component devices of the heat generation device 16 include a motor generator, a power control unit (so-called PCU), and a control device for an advanced drive assistance system (so-called ADAS).

The motor generator outputs driving force for traveling by being supplied with electric power, and generates regenerative electric power when the vehicle decelerates or the like. The PCU is obtained by integrating a transformer, a frequency converter, and the like in order to appropriately control power supplied to each in-vehicle device.

The proper temperature ranges of the component devices of the heat generation device 16 are different from each other. For example, the appropriate temperature range of the motor generator is wider than the appropriate temperature range of the power control unit and is set to a high temperature zone. Therefore, in order to properly use the power control unit, more delicate temperature management than the motor generator is required.

The thermal management system 1 according to the present embodiment includes the heating medium circuit 5, the refrigeration cycle 40, an indoor air conditioning unit 60, a control device 70, and the like, and performs air conditioning of the interior of the cabin which is a space to be air-conditioned, and performs a temperature adjustment of the battery 21 and the heat generation device 16.

The heating medium circuit 5 is a heating medium circulation circuit that circulates cooling water as a heating medium, and includes a high-temperature side heating medium circuit 10, a low-temperature side heating medium circuit 15, a device heating medium circuit 20, and a circuit connection portion 25.

In the thermal management system 1, the circuit configuration of the heating medium circuit 5 is switched as described later in order to perform air conditioning of the interior of the cabin and a temperature adjustment of each of the battery 21 and the heat generation device 16. In the thermal management system 1, an ethylene glycol aqueous solution which is an incompressible fluid is employed as a heating medium circulating in the heating medium circuit 5.

The refrigeration cycle 40 is a refrigerant circulation circuit that circulates a refrigerant. In the thermal management system 1, the circuit configuration of the refrigeration cycle 40 is switched according to various air conditioning operation modes described later.

As shown in FIG. 1, the high-temperature side heating medium circuit 10 includes a heater core 11, a heating medium passage 12b of a water refrigerant heat exchanger 12, a heating device 13, a first water pump 23a, and the like.

The first water pump 23a pumps the heating medium toward the heating medium passage 12b of the water refrigerant heat exchanger 12. The first water pump 23a is an electric pump whose rotation speed (that is, pressure feeding capability) is controlled by a control voltage output from the control device 70. The first water pump 23a corresponds to an example of a first heating medium pump.

The water refrigerant heat exchanger 12 is a component device of the high-temperature side heating medium circuit 10 and is one of component devices of the refrigeration cycle 40. The water refrigerant heat exchanger 12 includes a refrigerant passage 12a through which the refrigerant of the refrigeration cycle 40 flows, and a heating medium passage 12b through which the heating medium of the heating medium circuit 5 flows.

The water refrigerant heat exchanger 12 is formed of the same kind of metal (for example, an aluminum alloy) having excellent heat conductivity, and the respective constituent members are integrated by brazing. As a result, the refrigerant flowing through the refrigerant passage 12a and the heating medium flowing through the heating medium passage 12b can exchange heat with each other. The water refrigerant heat exchanger 12 is a radiator that radiates heat of the high-pressure refrigerant flowing through the refrigerant passage 12a to the heating medium flowing through the heating medium passage 12b in the refrigeration cycle 40.

In the following description, for clarity of explanation, in the heating medium passage 12b of the water refrigerant heat exchanger 12, the connection port on the first water pump 23a side is referred to as a heating medium inlet, and the connection port on the other side is referred to as a heating medium outlet.

The heating device 13 is connected to the heating medium outlet of the water refrigerant heat exchanger 12. The heating device 13 includes a heating passage and a heat generator, and heats a heating medium flowing into the heater core 11 by electric power supplied from a control device 70 to be described later. The calorific value of the heating device 13 can be arbitrarily adjusted by controlling the power from the control device 70.

The heating passage of the heating device 13 is a passage through which the heating medium flows. The heat generator heats the heating medium flowing through the heating passage by being supplied with electric power. Specifically, a PTC element or a nichrome wire can be employed as the heat generator. The heating device 13 together with water refrigerant heat exchanger 12 constitutes a heating unit that heats the heating medium.

A heating medium inlet of the heater core 11 is connected to an outlet of the heating device 13. The heater core 11 is a heat exchanger that exchanges heat between the heating medium and blown air blown from a blower 62 described later. The heater core 11 heats the blown air using heat of the heating medium heated by the water refrigerant heat exchanger 12, the heating device 13, and the like as a heat source. The heater core 11 is disposed in a casing 61 of the indoor air conditioning unit 60 described later.

The heating medium outlet of the heater core 11 is connected to the flow inlet port of the first heating medium three-way valve 30a. The first heating medium three-way valve 30a is configured by a three-way flow rate regulating valve having three flow inlet/outlet ports. The suction port of the first water pump 23a is connected to another flow inlet/outlet port of the first heating medium three-way valve 30a via a fifth connection portion 26e. A first connection portion 26a to be described later is connected to another flow inlet/outlet port of the first heating medium three-way valve 30a via a first connection passage 25a.

Therefore, the first heating medium three-way valve 30a can continuously adjust a flow rate ratio between a flow rate of the heating medium flowing out to the suction port of the first water pump 23a and a flow rate of the heating medium flowing out to the first connection passage 25a of the heating medium flowing out from the heater core 11. The operation of the first heating medium three-way valve 30a is controlled by a control signal output from the control device 70.

Furthermore, the first heating medium three-way valve 30a can cause the total flow rate of the heating medium flowing out from the heater core 11 to flow out to either the first water pump 23a or the first connection passage 25a. Accordingly, the first heating medium three-way valve 30a can switch the circuit configuration of the heating medium circuit 5. Therefore, the first heating medium three-way valve 30a constitutes part of the circuit switch unit.

As shown in FIG. 1, a second heating medium three-way valve 30b is disposed between the first water pump 23a and the heating medium passage 12b of the water refrigerant heat exchanger 12 in the high-temperature side heating medium circuit 10. The configuration of the second heating medium three-way valve 30b is similar to that of the first heating medium three-way valve 30a.

The discharge port of the first water pump 23a is connected to one flow inlet/outlet port of the second heating medium three-way valve 30b. Another flow inlet/outlet port of the second heating medium three-way valve 30b is connected to the heating medium inlet of the heating medium passage 12b of the water refrigerant heat exchanger 12 via a second connection portion 26b described later. A third connection passage 25c to be described later is connected to another flow inlet/outlet port of the second heating medium three-way valve 30b.

As in the first heating medium three-way valve 30a, the operation of the second heating medium three-way valve 30b is controlled by a control signal output from the control device 70. That is, since the second heating medium three-way valve 30b can switch the circuit configuration of the heating medium circuit 5, the second heating medium three-way valve 30b constitutes part of the circuit switch unit as in the first heating medium three-way valve 30a.

Next, a configuration of the low-temperature side heating medium circuit 15 will be described. The low-temperature side heating medium circuit 15 includes a heating medium passage 16a of the heat generation device 16, a radiator 17, a second water pump 23b, and the like. The second water pump 23b pumps the heating medium toward one end of the heating medium passage 16a in the heat generation device 16. The basic configuration of second water pump 23b is similar to that of first water pump 23a. The second water pump 23b corresponds to an example of a second heating medium pump.

One flow inlet/outlet port of a first heating medium on-off valve 31a is connected to the discharge port of the second water pump 23b via a seventh connection portion 26g and a third connection portion 26c to be described later. The first heating medium on-off valve 31a switches the presence or absence of the flow of the heating medium by opening and closing the heating medium passage connecting the discharge port of the second water pump 23b and the heating medium passage 16a of the heat generation device 16.

The first heating medium on-off valve 31a is an electromagnetic valve whose operation is controlled by a control voltage output from the control device 70. Therefore, the first heating medium on-off valve 31a constitutes part of a circuit switch unit that switches the circuit configuration of the heating medium circuit 5.

The inlet of the heating medium passage 16a of the heat generation device 16 is connected to the other flow inlet/outlet port of the first heating medium on-off valve 31a via the first connection portion 26a. The heating medium passage 16a of the heat generation device 16 is formed in a housing portion forming an outer shell of the heat generation device 16, a case, or the like.

The heating medium passage 16a of the heat generation device 16 is a heating medium passage for adjusting the temperature of the heat generation device 16 by circulating the heating medium. In other words, the heating medium passage 16a of the heat generation device 16 functions as a temperature adjustment unit that adjusts the temperature of the heat generation device 16 by heat exchange with the heating medium circulating in the heating medium circuit 5.

A third heating medium three-way valve 30c constituting a flow rate adjustment unit 19 is connected to the other end of the heating medium passage 16a in the heat generation device 16 via a ninth connection portion 26i. The configuration of the third heating medium three-way valve 30c is similar to that of the first heating medium three-way valve 30a. The heating medium passage of the ninth connection portion 26i is connected to one flow inlet/outlet port of the third heating medium three-way valve 30c. The heating medium inlet of the radiator 17 is connected to another flow inlet/outlet port of the third heating medium three-way valve 30c. An alternative passage 18 is connected to another flow inlet/outlet port of the third heating medium three-way valve 30c.

Therefore, the third heating medium three-way valve 30c can continuously adjust the flow rate ratio between the flow rate of the heating medium flowing out to the radiator 17 and the flow rate of the heating medium flowing out to the alternative passage 18 of the heating medium flowing in from the ninth connection portion 26i. Therefore, the third heating medium three-way valve 30c constitutes a flow rate adjustment unit 19 for adjusting the flow rate ratio between the flow rate of the heating medium passing through the radiator 17 and flow rate of the heating medium passing through the alternative passage 18.

The radiator 17 is a heat exchanger that exchanges heat between the heating medium circulating inside and outside air. Therefore, the radiator 17 radiates the heat of the heating medium flowing inside to the outside air. The heating medium outlet of the radiator 17 is connected to the suction port of the second water pump 23b via the third connection portion 26c. The radiator 17 is disposed on the front side in the drive device chamber. Therefore, the radiator 17 can be configured integrally with an outdoor heat exchanger 46 described later.

The alternative passage 18 is a heating medium passage for allowing the heating medium that passed through the second heating medium three-way valve 30b to detour around the radiator 17. The end portion of the alternative passage 18 is connected to the third connection portion 26c disposed in the heating medium passage connecting the heating medium outlet of the radiator 17 and the suction port of the second water pump 23b.

Next, a configuration of the device heating medium circuit 20 will be described. The device heating medium circuit 20 includes a heating medium passage 21a of the battery 21, a heating medium passage 22b of a chiller 22, a third water pump 23c, and the like. The third water pump 23c pumps the heating medium toward one end portion of the heating medium passage 21a of the battery 21. The basic configuration of third water pump 23c is similar to that of first water pump 23a. The third water pump 23c corresponds to an example of a third heating medium pump.

The inlet of the heating medium passage 22b of the chiller 22 is connected to the discharge port of the third water pump 23c via a fourth connection portion 26d. The chiller 22 is a component device of the device heating medium circuit 20 and is also one of component devices of the refrigeration cycle 40. The chiller 22 includes a refrigerant passage 22a through which the refrigerant of the refrigeration cycle 40 flows and the heating medium passage 22b through which the heating medium of the heating medium circuit 5 flows.

The chiller 22 is formed of the same kind of metal (for example, an aluminum alloy) having excellent heat conductivity, and the respective constituent members are integrated by brazing. As a result, the refrigerant flowing through the refrigerant passage 22a and the heating medium flowing through the heating medium passage 22b can exchange heat with each other. The chiller 22 is a heat absorber that causes the low-pressure refrigerant flowing through the refrigerant passage 12a to absorb heat of the heating medium flowing through the heating medium passage 22b in the refrigeration cycle 40.

The heating medium passage 21a of the battery 21 is connected to the heating medium outlet of the heating medium passage 22b of the chiller 22. The battery 21 is a secondary battery (for example, a lithium ion battery) that stores electric power supplied to a motor generator or the like. The battery 21 is an assembled battery formed by connecting a plurality of battery cells in series or in parallel. The battery 21 generates heat during charging and discharging.

The heating medium passage 21a of the battery 21 is a heating medium passage for adjusting the temperature of the battery 21 by circulating the heating medium, and constitutes a device heat exchange unit. That is, the heating medium passage 21a of the battery 21 is connected so that the heating medium of the heating medium circuit 5 is allowed to flow in and out.

The heating medium passage 21a of the battery 21 functions as a cooling unit that cools the battery 21 using the low-temperature heating medium as a cold heat source when the heating medium cooled by the chiller 22 flows. In addition, the heating medium passage 21a of the battery 21 functions as a temperature raising unit that heats the battery 21 using the high temperature heating medium as a heat source when the high temperature heating medium flows.

The heating medium passage 21a of the battery 21 is formed in a dedicated case of the battery 21. The passage configuration of the heating medium passage 21a of the battery 21 is a passage configuration in which a plurality of passages is connected in parallel inside the dedicated case.

As a result, the heating medium passage 21a can uniformly exchange heat with the heating medium in the entire area of the battery 21. For example, the heating medium passage 21a is formed so as to uniformly absorb heat of all the battery cells and uniformly cool all the battery cells. The suction port of the third water pump 23c is connected to an outlet of the heating medium passage 21*a* of the battery 21 via a sixth connection portion 26*f* described later.

In the device heating medium circuit 20, a fourth heating medium check valve 32*d* is disposed between the sixth connection portion 26*f* and the suction port of the third water pump 23*c*. The fourth heating medium check valve 32*d* allows the heating medium to flow from the sixth connection portion 26*f* to the suction port of the third water pump 23*c*, and prohibits the heating medium from flowing from the suction port of the third water pump 23*c* to the sixth connection portion 26*f*.

As illustrated in FIG. 1, the heating medium circuit 5 includes the circuit connection portion 25 that connects the high-temperature side heating medium circuit 10, the low-temperature side heating medium circuit 15, and the device heating medium circuit 20 so that the heating medium is allowed to flow in and out. The circuit connection portion 25 in the present embodiment includes a first connection passage 25*a*, a second connection passage 25*b*, a third connection passage 25*c*, a fourth connection passage 25*d*, a fifth connection passage 25*e*, and a sixth connection passage 25*f*.

As described above, one end portion of the first connection passage 25*a* is connected to another flow inlet/outlet port of the first heating medium three-way valve 30*a*. The other end portion of the first connection passage 25*a* is connected to the first connection portion 26*a*. The first connection portion 26*a* is located between the heating medium passage 16*a* of the heat generation device 16 and the first heating medium on-off valve 31*a*. That is, the first connection passage 25*a* is connected so that the heating medium is allowed to flow in and out between the high-temperature side heating medium circuit 10 and the low-temperature side heating medium circuit 15.

One end portion of the second connection passage 25*b* is connected to the second connection portion 26*b*. The second connection portion 26*b* is located between another flow inlet/outlet port of the second heating medium three-way valve 30*b* and the heating medium inlet of the heating medium passage 12*b* of the water refrigerant heat exchanger 12. The other end portion of the second connection passage 25*b* is connected to the third connection portion 26*c*. The third connection portion 26*c* is disposed closer to the first heating medium on-off valve 31*a* than the seventh connection portion 26*g* between the first heating medium on-off valve 31*a* and the discharge port of the second water pump 23*b*.

Therefore, as in the first connection passage 25*a*, the second connection passage 25*b* is connected so that the heating medium is allowed to flow in and out between the high-temperature side heating medium circuit 10 and the low-temperature side heating medium circuit 15. A first heating medium check valve 32*a* is disposed in the second connection passage 25*b*. The first heating medium check valve 32*a* allows the heating medium to flow from the third connection portion 26*c* to the second connection portion 26*b*, and prohibits the heating medium from flowing from the second connection portion 26*b* to the third connection portion 26*c*.

One end portion of the third connection passage 25*c* is connected to another flow inlet/outlet port of the second heating medium three-way valve 30*b*. The other end portion of the third connection passage 25*c* is connected to the fourth connection portion 26*d*. The fourth connection portion 26*d* is disposed closer to the chiller 22 than an eighth connection portion 26*h* between the discharge port of the third water pump 23*c* and the heating medium inlet of the heating medium passage 22*b* of the chiller 22. Therefore, the third connection passage 25*c* is connected so that the heating medium is allowed to flow in and out between the high-temperature side heating medium circuit 10 and the device heating medium circuit 20.

One end portion of the fourth connection passage 25*d* is connected to the fifth connection portion 26*e*. The fifth connection portion 26*e* is located between another flow inlet/outlet port of the first heating medium three-way valve 30*a* and the suction port of the first water pump 23*a*.

The other end portion of the fourth connection passage 25*d* is connected to the sixth connection portion 26*f*. The sixth connection portion 26*f* is disposed between the outlet of the heating medium passage 21*a* in the battery 21 and the inlet of the fourth heating medium check valve 32*d*. That is, as in the third connection passage 25*c*, the fourth connection passage 25*d* is connected so that the heating medium is allowed to flow in and out between the high-temperature side heating medium circuit 10 and the device heating medium circuit 20.

A second heating medium check valve 32*b* is disposed in the fourth connection passage 25*d*. The second heating medium check valve 32*b* allows the heating medium to flow from the sixth connection portion 26*f* to the fifth connection portion 26*e*, and prohibits the heating medium from flowing from the fifth connection portion 26*e* to the sixth connection portion 26*f*.

One end portion of the fifth connection passage 25*e* is connected to the seventh connection portion 26*g*. The seventh connection portion 26*g* is disposed closer to the second water pump 23*b* than the third connection portion 26*c* between the first heating medium on-off valve 31*a* and the discharge port of the second water pump 23*b*.

The other end portion of the fifth connection passage 25*e* is connected to the eighth connection portion 26*h*. The eighth connection portion 26*h* is disposed closer to the third water pump 23*c* than the fourth connection passage 25*d* between the discharge port of the third water pump 23*c* and the heating medium inlet of the heating medium passage 22*b* of the chiller 22. Therefore, the fifth connection passage 25*e* is connected so that the heating medium is allowed to flow in and out between the low-temperature side heating medium circuit 15 and the device heating medium circuit 20.

A third heating medium check valve 32*c* is disposed in the fifth connection passage 25*e*. The third heating medium check valve 32*c* allows the heating medium to flow from the seventh connection portion 26*g* to the eighth connection portion 26*h*, and prohibits the heating medium from flowing from the eighth connection portion 26*h* to the seventh connection portion 26*g*.

One end portion of the sixth connection passage 25*f* is connected to the ninth connection portion 26*i*. The ninth connection portion 26*i* is disposed between the outlet of the heating medium passage 16*a* of the heat generation device 16 and the flow inlet port of the third heating medium three-way valve 30*c*. The other end portion of the sixth connection passage 25*f* is connected to the above-described sixth connection portion 26*f*. Therefore, as in the fifth connection passage 25*e*, the sixth connection passage 25*f* is connected so that the heating medium is allowed to flow in and out between the low-temperature side heating medium circuit 15 and the device heating medium circuit 20.

A second heating medium on-off valve 31*b* is disposed in the sixth connection passage 25*f*. The second heating medium on-off valve 31*b* has the same configuration as the first heating medium on-off valve 31*a*. Therefore, the second heating medium on-off valve 31b constitutes part of a circuit switch unit that switches the circuit configuration of the heating medium circuit 5.

Since the circuit connection portion 25 of the present embodiment includes the first connection passage 25a to the sixth connection passage 25f, the high-temperature side heating medium circuit 10, the low-temperature side heating medium circuit 15, and the device heating medium circuit 20 are connected so that the heating medium is allowed to flow in and out.

In the thermal management system 1 according to the present embodiment, the circuit configuration of the heating medium circuit 5 can be changed by controlling the operations of the first heating medium three-way valve 30a, the second heating medium three-way valve 30b, the first heating medium on-off valve 31a, and the second heating medium on-off valve 31b. Therefore, the first heating medium three-way valve 30a and the like and the configuration for controlling the operation thereof correspond to an example of a circuit switch unit.

The third heating medium three-way valve 30c constituting the flow rate adjustment unit 19 can switch the flow of the heating medium between the flow toward the radiator 17 and the flow toward the alternative passage 18 by the operation thereof. Therefore, the flow rate adjustment unit 19 can be included in part of the circuit switch unit.

Figure 2:
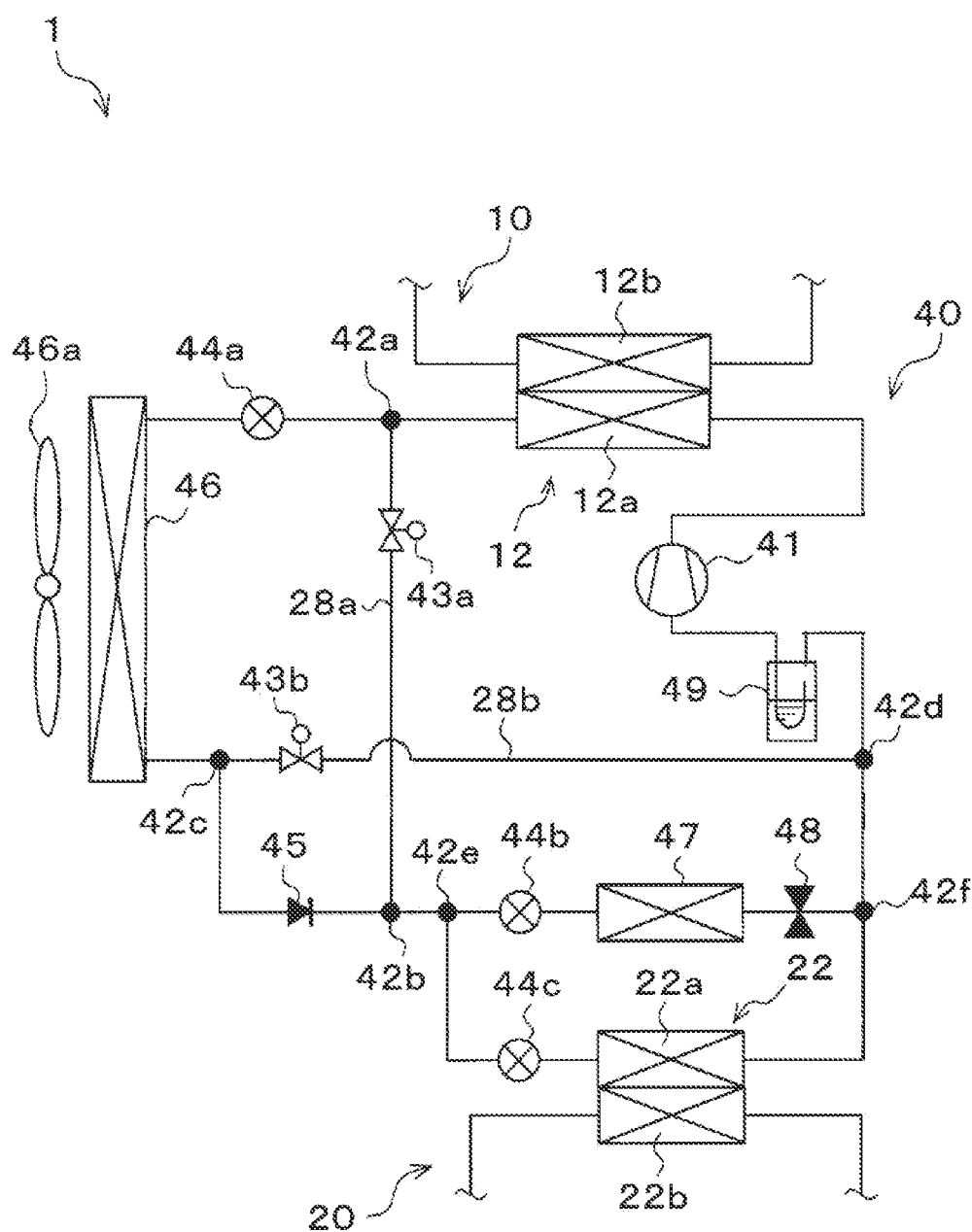
FIG. 2 is a configuration diagram of a refrigeration cycle constituting a thermal management system.

Next, a configuration of the refrigeration cycle 40 in the thermal management system 1 according to the present embodiment will be described with reference to the drawings. As shown in FIG. 2, in the refrigeration cycle 40, a compressor 41, a water refrigerant heat exchanger 12, a heating expansion valve 44a, a cooling expansion valve 44b, a chilling expansion valve 44c, an outdoor heat exchanger 46, an indoor evaporator 47, a chiller 22, and the like are connected to each other.

Among the component devices of the refrigeration cycle 40, the compressor 41 sucks, compresses, and discharges the refrigerant in the refrigeration cycle 40. The compressor 41 is disposed in a drive device chamber that is disposed in front of the cabin and accommodates an electric motor and the like.

The compressor 41 is an electric compressor in which a fixed capacity type compression mechanism having a fixed discharge capacity is rotationally driven by an electric motor. The rotation speed (that is, refrigerant discharge capacity) of the compressor 41 is controlled by a control signal output from the control device 70 described later.

The inlet of refrigerant passage 12a of water refrigerant heat exchanger 12 is connected to the discharge port of compressor 41. As described above, water refrigerant heat exchanger 12 includes the refrigerant passage 12a and the heating medium passage 12b.

The flow inlet port of a first three-way joint 42a having a three-way joint structure having three flow inlet/outlet ports communicating with each other is connected to the outlet of refrigerant passage 12a of water refrigerant heat exchanger 12. As the three-way joint structure, a three-way joint structure formed by joining a plurality of pipes, or a three-way joint structure formed by providing a plurality of refrigerant passages in a metal block or a resin block can be used.

Further, the refrigeration cycle 40 includes a second three-way joint 42b to a sixth three-way joint 42f configured as in the first three-way joint 42a. The basic configuration of the second three-way joint 42b to the sixth three-way joint 42f is similar to that of first three-way joint 42a.

The inlet of the heating expansion valve 44a is connected to one flow outlet port of the first three-way joint 42a. One flow inlet port of the second three-way joint 42b is connected to the other flow outlet port of the first three-way joint 42a via a refrigerant bypass passage 50. A dehumidifying on-off valve 43a is disposed in the refrigerant bypass passage 50.

The dehumidifying on-off valve 43a is an electromagnetic valve that opens and closes a refrigerant passage connecting the other flow outlet port of first three-way joint 42a and the one flow inlet port of the second three-way joint 42b. The refrigeration cycle 40 further includes a heating on-off valve 43b as described later. A basic configuration of the heating on-off valve 43b is similar to that of the dehumidifying on-off valve 43a. The dehumidifying on-off valve 43a and the heating on-off valve 43b can switch the refrigerant circuit in each operation mode by opening and closing the refrigerant passage.

The heating expansion valve 44a is a heating decompressor that decompresses the high-pressure refrigerant flowing out of the refrigerant passage 12a of the water refrigerant heat exchanger 12 and adjusts a flow rate (mass flow rate) of the refrigerant flowing out to the downstream side at least in an operation mode for heating the interior of the cabin. The heating expansion valve 44a is an electric variable throttle mechanism including a valve body configured to change a throttle opening and an electric actuator that changes the opening of the valve body.

The refrigeration cycle 40 further includes the cooling expansion valve 44b and the chilling expansion valve 44c. The basic configurations of the cooling expansion valve 44b and the chilling expansion valve 44c are similar to those of the heating expansion valve 44a.

The heating expansion valve 44a, the cooling expansion valve 44b, and the chilling expansion valve 44c have a fully open function and a fully closed function. In the fully open function, the valve opening degree is fully opened to function as a simple refrigerant passage without exhibiting a flow rate adjusting action and a refrigerant pressure reducing action. The fully closed function is a function of closing the refrigerant passage by fully closing the valve opening degree. By the fully open function and the fully closed function, the heating expansion valve 44a, the cooling expansion valve 44b, and the chilling expansion valve 44c can switch the refrigerant circuit of each operation mode.

Therefore, the heating expansion valve 44a, the cooling expansion valve 44b, and the chilling expansion valve 44c of the present embodiment also have a function as a refrigerant circuit switch unit. The operations of the heating expansion valve 44a, the cooling expansion valve 44b, and the chilling expansion valve 44c are controlled by a control signal (control pulse) output from the control device 70.

The refrigerant inlet of the outdoor heat exchanger 46 is connected to the outlet of the heating expansion valve 44a. The outside air fan 46a is disposed to blow outside air to the outdoor heat exchanger 46. The outdoor heat exchanger 46 exchanges heat between the refrigerant flowing out of the heating expansion valve 44a and outside air blown by the outside air fan 46a. The outdoor heat exchanger 46 is disposed on the front side in the drive device room. Therefore, during traveling of the vehicle, traveling air can be applied to the outdoor heat exchanger 46.

The flow inlet port of the third three-way joint 42c is connected to the refrigerant flow outlet port of the outdoor heat exchanger 46. One flow inlet port of the fourth three-way joint 42d is connected to one flow outlet port of the third three-way joint 42c via a heating refrigerant passage 51. The heating on-off valve 43b that opens and closes the refrigerant passage is disposed in the heating refrigerant passage 51.

The other flow inlet port of the second three-way joint 42b is connected to the other flow outlet port of the third three-way joint 42c. A refrigerant check valve 45 is disposed in a refrigerant passage connecting the other flow outlet port of the third three-way joint 42c and the other flow inlet port of the second three-way joint 42b. The refrigerant check valve 45 allows the refrigerant to flow from the third three-way joint 42c to the second three-way joint 42b, and prohibits the refrigerant from flowing from the second three-way joint 42b to the third three-way joint 42c.

The flow inlet port of the fifth three-way joint 42e is connected to the flow outlet port of the second three-way joint 42b. The inlet of the cooling expansion valve 44b is connected to one flow outlet port of the fifth three-way joint 42e. The inlet of the chilling expansion valve 44c is connected to the other flow outlet port of the fifth three-way joint 42e.

The cooling expansion valve 44b is a cooling decompressor that decompresses the refrigerant having passed through the fifth three-way joint 42e and adjusts the flow rate of the refrigerant flowing out to the downstream side at least in an operation mode for cooling the interior of the cabin.

The refrigerant inlet of the indoor evaporator 47 is connected to the outlet of the cooling expansion valve 44b. The indoor evaporator 47 is disposed in the casing 61 of the indoor air conditioning unit 60. The indoor evaporator 47 is a chilling heat exchanger that exchanges heat between the low-pressure refrigerant decompressed by the cooling expansion valve 44b and the blown air blown from the blower 62 to evaporate the low-pressure refrigerant, and cools the blown air by causing the low-pressure refrigerant to exert a heat absorbing action.

The chilling expansion valve 44c is a chilling decompressor that decompresses the refrigerant passing through the fifth three-way joint 42e and adjusts the flow rate of the refrigerant flowing out to the downstream side at least in the operation mode of chilling the battery 21.

The inlet of the refrigerant passage 22a of the chiller 22 is connected to the outlet of the chilling expansion valve 44c. As described above, the chiller 22 includes the refrigerant passage 22a and the heating medium passage 22b. The chiller 22 is a chilling evaporator that exchanges heat between the low-pressure refrigerant decompressed by the chilling expansion valve 44c and the heating medium flowing through the heating medium passage 22b to evaporate the low-pressure refrigerant and exert a heat absorbing action. The other flow inlet port of the sixth three-way joint 42f is connected to the outlet of the refrigerant passage 22a of the chiller 22.

The inlet of an evaporation pressure regulating valve 48 is connected to the refrigerant outlet of the indoor evaporator 47. The evaporation pressure regulating valve 48 maintains the refrigerant evaporating pressure at the indoor evaporator 47 at a predetermined reference pressure or higher to prevent frosting at the indoor evaporator 47. The evaporation pressure regulating valve 48 is configured by a mechanical variable throttle mechanism that increases a valve opening degree in accordance with an increase in pressure of the refrigerant at the outlet of the indoor evaporator 47.

With this configuration, the evaporation pressure regulating valve 48 maintains the refrigerant evaporating temperature at the indoor evaporator 47 at a temperature equal to or higher than a frosting suppression temperature (in the present embodiment, 1° C.) at which frosting at the indoor evaporator 47 can be suppressed. One flow inlet port of the sixth three-way joint 42f is connected to the outlet of the evaporation pressure regulating valve 48. The other flow inlet port of the fourth three-way joint 42d is connected to the flow outlet port of the sixth three-way joint 42f.

The inlet of an accumulator 49 is connected to the flow outlet port of the fourth three-way joint 42d. The accumulator 49 is a gas-liquid separator that separates the refrigerant flowing into the accumulator into gas and liquid and stores surplus liquid-phase refrigerant in the cycle, and corresponds to an example of a liquid storage unit. The suction port of the compressor 41 is connected to the gas-phase refrigerant outlet of the accumulator 49.

According to the refrigeration cycle 40, it is possible to switch to various refrigerant circuits by controlling the operations of the heating expansion valve 44a, the cooling expansion valve 44b, the chilling expansion valve 44c, the dehumidifying on-off valve 43a, and the heating on-off valve 43b. That is, the refrigeration cycle 40 can be switched to a refrigerant circuit in a heating mode, a refrigerant circuit in a cooling mode, a refrigerant circuit in a dehumidification heating mode, and the like.

Figure 3:
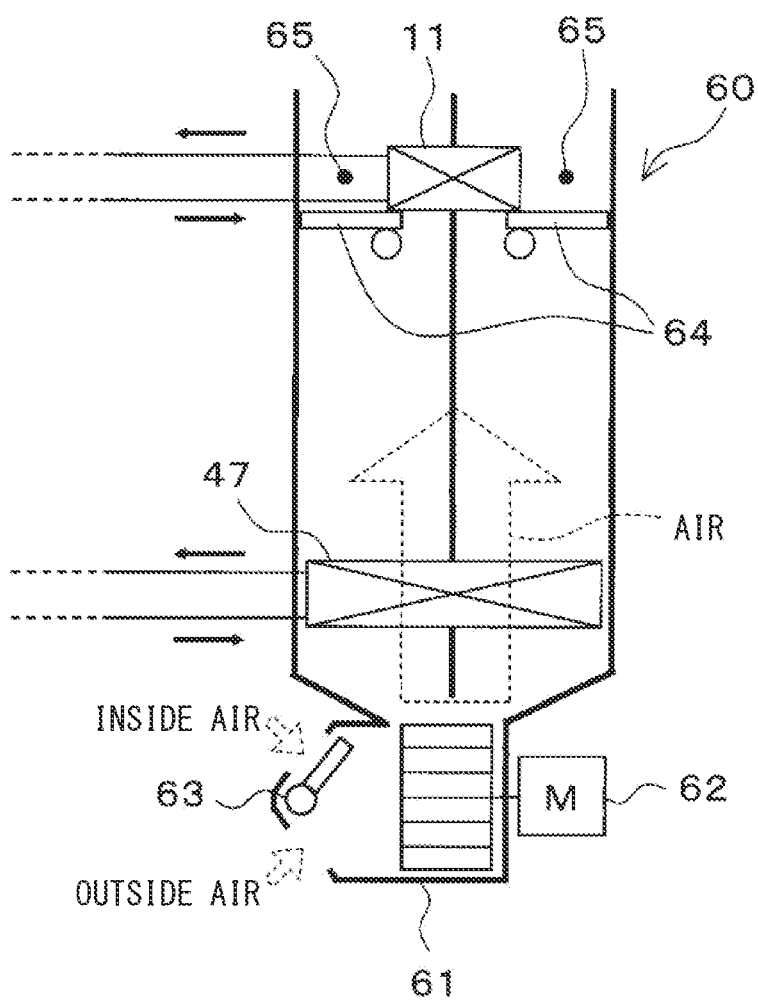
FIG. 3 is a schematic overall configuration diagram of an indoor air conditioning unit in the thermal management system.

Next, the indoor air conditioning unit 60 of the thermal management system 1 will be described with reference to FIG. 3. The indoor air conditioning unit 60 blows out the blown air, the temperature of which is adjusted by the heating medium circuit 5 and the refrigeration cycle 40, into the cabin. The indoor air conditioning unit 60 is disposed inside an instrument panel at the foremost part of the interior of the cabin.

The indoor air conditioning unit 60 accommodates the blower 62, the indoor evaporator 47, the heater core 11, and the like inside an air passage formed in the casing 61 forming an outer shell thereof. The casing 61 forms an air passage for the blown air to be blown into the cabin. The casing 61 is formed of resin (for example, polypropylene) having a certain degree of elasticity and excellent strength.

An inside/outside air switch device 63 is disposed on the most upstream side of the casing 61 in the blown air flow direction. The inside/outside air switch device 63 switches between inside air (air inside the cabin) and outside air (air outside the cabin) to introduce the air into the casing 61.

The inside/outside air switch device 63 continuously adjusts opening areas of an inside air introduction port through which inside air is introduced and an outside air introduction port through which outside air is introduced into the casing 61 through the inside/outside air switch door to change an introduction ratio between an introduction air volume of the inside air and an introduction air volume of the outside air. The inside/outside air switch door is driven by an electric actuator for the inside/outside air switch door. The operation of the electric actuator is controlled by a control signal output from the control device 70.

The blower 62 is disposed on the downstream side of the inside/outside air switch device 63 in the blown air flow direction. The blower 62 blows air sucked through the inside/outside air switch device 63 toward the interior of the cabin. The blower 62 is an electric blower that drives a centrifugal multi-blade fan with an electric motor. The rotation speed (that is, air blowing capacity) of the blower 62 is controlled by a control voltage output from the control device 70.

The indoor evaporator 47 and the heater core 11 are disposed in this order with respect to the blown air flow on the downstream side of the blower 62 in the blown air flow direction. That is, the indoor evaporator 47 is disposed upstream of the heater core 11 in the blown air flow direction.

In the casing 61, a cold air bypass passage 65 through which the blown air after passing through the indoor evaporator 47 flows while detouring around the heater core 11 is provided. An air mixing door 64 is disposed downstream of the indoor evaporator 47 in the blown air flow direction and upstream of the heater core 11 in the blown air flow direction in the casing 61.

The air mixing door 64 is an air volume ratio adjustment unit that adjusts an air volume ratio between an air volume of the blown air passing through the heater core 11 and an air volume of the blown air passing through the cold air bypass passage 65 of the blown air after passing through the indoor evaporator 47. The air mixing door 64 is driven by an electric actuator for the air mixing door. The operation of the electric actuator is controlled by a control signal output from the control device 70.

A mixing space is disposed downstream of the heater core 11 and the cold air bypass passage 65 in the blown air flow direction in the casing 61. The mixing space is a space for mixing the blown air heated by the heater core 11 and the blown air passing through the cold air bypass passage 65 and not heated.

An opening hole for blowing the blown air (that is, air-conditioned wind) mixed in the mixing space into the cabin which is the space to be air-conditioned is disposed on downstream side of the casing 61 the blown air flow direction. As the opening holes, a face opening hole, a foot opening hole, and a defroster opening hole (all not illustrated) are provided.

The face opening hole is an opening hole for blowing conditioned air toward the upper body of the occupant in the cabin. The foot opening hole is an opening hole for blowing conditioned air toward the feet of the occupant. The defroster opening hole is an opening hole for blowing conditioned air toward the inner face of the windshield.

The face opening hole, the foot opening hole, and the defroster opening hole are connected to a face blow-out port, a foot blow-out port, and a defroster blow-out port (all not illustrated) provided in the cabin via ducts forming air passages, respectively. Therefore, the temperature of the conditioned air mixed in the mixing space is adjusted by the air mixing door 64 adjusting the air volume ratio between the air volume passing through the heater core 11 and the air volume passing through the cold air bypass passage 65. The temperature of the blown air (conditioned air) blown into the cabin from each of the blow-out ports is adjusted.

A face door, a foot door, and a defroster door (none of which are illustrated) are disposed upstream of the face opening hole, the foot opening hole, and the defroster opening hole in the blown air flow direction, respectively. The face door adjusts an opening area of the face opening hole. The foot door adjusts an opening area of the foot opening hole. The defroster door adjusts an opening area of the defroster opening hole.

The face door, the foot door, and the defroster door constitute a blow-out port mode switch device that switches a blow-out port mode. Each of these doors is connected to an electric actuator for driving the blow-out port mode door via a link mechanism or the like, and is rotated in conjunction therewith. The operation of the electric actuator is also controlled by a control signal output from the control device 70.

Specific examples of the blow-out port mode switched by the blow-out port mode switch device include a face mode, a bi-level mode, and a foot mode.

The face mode is a blow-out port mode in which the face blow-out port is fully opened and air is blown out from the face blow-out port toward the upper body of the occupant in the cabin. The bi-level mode is a blow-out port mode in which both the face blow-out port and the foot blow-out port are opened to blow air toward the upper body and the feet of the occupant in the cabin. The foot mode is a blow-out port mode in which the foot blow-out port is fully opened and the defroster blow-out port is opened by a small opening degree and air is mainly blown out from the foot blow-out port.

Further, it can be switched to the defroster mode by the occupant manually operating the blow-out mode selector switch provided on the operation panel 80. The defroster mode is a blow-out port mode in which the defroster blow-out port is fully opened and air is blown out from the defroster blow-out port to the inner face of the windshield.

Next, a control system of the thermal management system 1 according to the present embodiment will be described with reference to FIG. 4. The control device 70 includes known microcomputers including a CPU, a ROM, a RAM, and the like, and peripheral circuits thereof. The control device 70 performs various calculations and processes based on a control program stored in the ROM. The control device 70 controls the operations of various output side devices to be controlled based on the calculation and processing results. The devices to be controlled in the heating medium circuit 5 include the heating device 13, the flow rate adjustment unit 19, the first water pump 23a, the second water pump 23b, the third water pump 23c, the first heating medium three-way valve 30a, the second heating medium three-way valve 30b, the first heating medium on-off valve 31a, and the second heating medium on-off valve 31b.

The devices to be controlled in the refrigeration cycle 40 include the compressor 41, the dehumidifying on-off valve 43a, the heating on-off valve 43b, the heating expansion valve 44a, the cooling expansion valve 44b, and the chilling expansion valve 44c. Further, the devices to be controlled in the indoor air conditioning unit 60 include the blower 62, and the electric actuators of the inside/outside air switch device 63 and the air mixing door 64.

Figure 4:
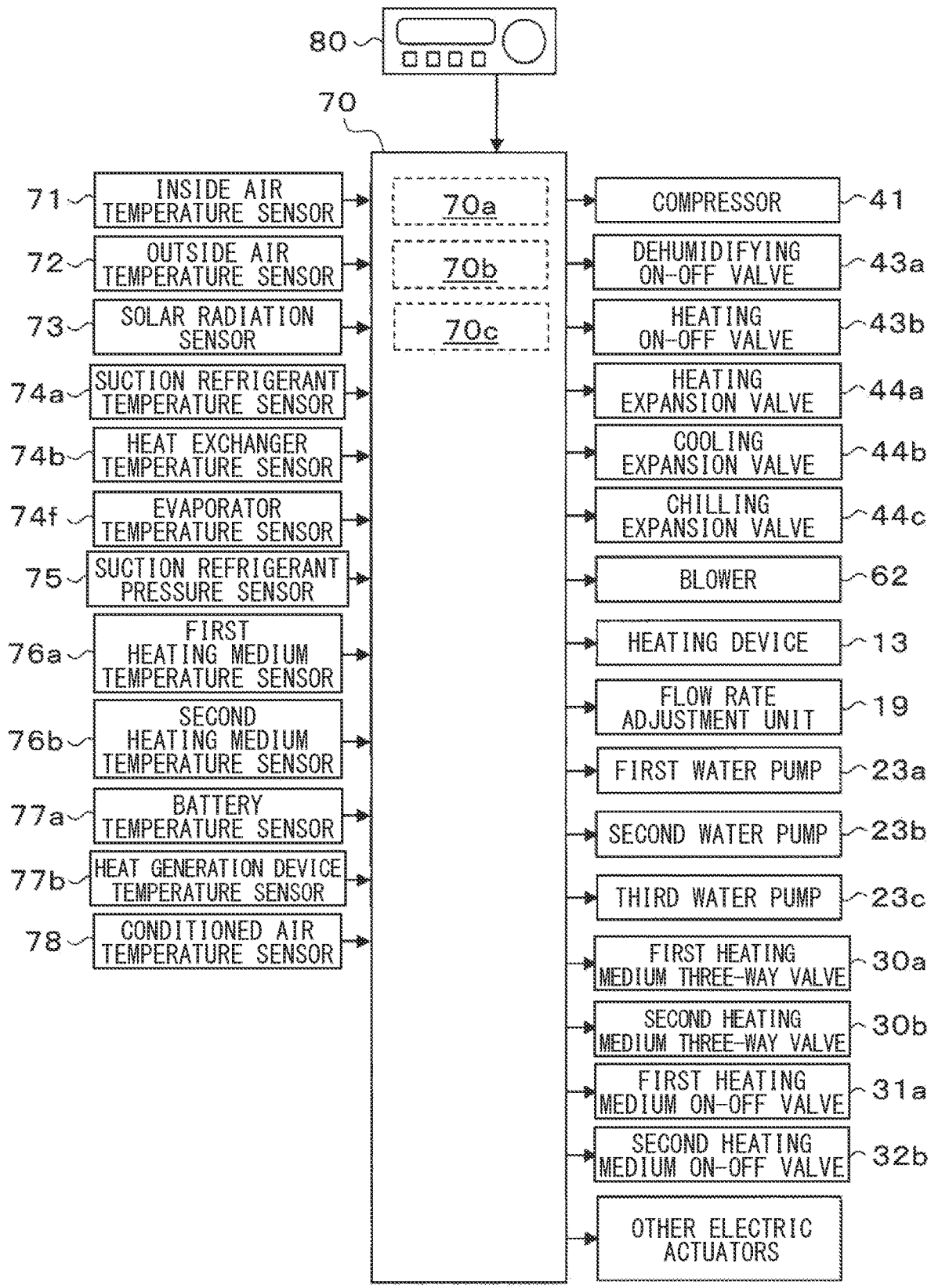
FIG. 4 is a block diagram illustrating a control system of a thermal management system according to an embodiment.

As illustrated in FIG. 4, various detection sensors for controlling the operation mode of the thermal management system 1 are connected to the input port of the control device 70. Therefore, detection signals of various detection sensors are input to the control device 70.

The various detection sensors include an inside air temperature sensor 71, an outside air temperature sensor 72, and a solar radiation sensor 73. The inside air temperature sensor 71 is an inside air temperature detection unit that detects a cabin interior temperature (inside air temperature) Tr. The outside air temperature sensor 72 is an outside air temperature detection unit that detects a cabin exterior temperature (outside air temperature) Tam. The solar radiation sensor 73 is a solar radiation amount detection unit that detects a solar radiation amount As with which the interior of cabin is irradiated.

As illustrated in FIG. 4, the various detection sensors include a suction refrigerant temperature sensor 74a, a heat exchanger temperature sensor 74b, an evaporator temperature sensor 74f, and a suction refrigerant pressure sensor 75. The suction refrigerant temperature sensor 74a is a suction refrigerant temperature detection unit that detects a suction refrigerant temperature Ts of the refrigerant sucked into the compressor 41. Heat exchanger temperature sensor 74b is a heat exchanger temperature detection unit that detects a temperature (heat exchanger temperature) TC of the refrigerant passing through the water refrigerant heat exchanger 12. Specifically, heat exchanger temperature sensor 74b detects a temperature of the outer face of the water refrigerant heat exchanger 12.

The evaporator temperature sensor 74f is an evaporator temperature detection unit that detects a refrigerant evaporating temperature (evaporator temperature) Tefin at the indoor evaporator 47. Specifically, the evaporator temperature sensor 74f detects the temperature of the heat exchange fin of the indoor evaporator 47. The suction refrigerant pressure sensor 75 is a suction refrigerant pressure detection unit that detects a suction refrigerant pressure Ps of the refrigerant sucked into the compressor 41.

Further, the various detection sensors include a first heating medium temperature sensor 76a, a second heating medium temperature sensor 76b, a battery temperature sensor 77a, a heat generation device temperature sensor 77b, and a conditioned air temperature sensor 78.

The first heating medium temperature sensor 76a is a first heating medium temperature detection unit that detects a temperature TW1 of the heating medium flowing into the heater core 11. The second heating medium temperature sensor 76b is a second heating medium temperature detection unit that detects a temperature TW2 of the heating medium flowing into the heating medium passage 21a of the battery 21. The conditioned air temperature sensor 78 is a conditioned air temperature detection unit that detects a temperature TAV of the blown air blown into the cabin from the mixing space.

The battery temperature sensor 77a is a battery temperature detection unit that detects a battery temperature TBA that is the temperature of the battery 21 mounted on the vehicle. The battery temperature sensor 77a includes a plurality of temperature detection units, and detects temperatures at a plurality of locations of the battery 21. Therefore, the control device 70 can also detect a temperature difference between respective units of the battery 21. Furthermore, as the battery temperature TBA, an average value of detection values of a plurality of temperature sensors is used.

The heat generation device temperature sensor 77b is a heat generation device temperature detection unit that detects a heat generation device temperature TMG which is the temperature of the heat generation device 16. The heat generation device temperature sensor 77b detects the temperature of the outer face of the housing forming the outer shell of the heat generation device 16.

As illustrated in FIG. 4, an operation panel 80 is connected to the input port of the control device 70. The operation panel 80 is disposed near the instrument panel in the front portion of the interior of the cabin, and includes various operation switches. Therefore, operation signals from various operation switches are input to the control device 70.

Specifically, the various operation switches of the operation panel 80 include an automatic switch, an air conditioner switch, an air volume setting switch, a temperature setting switch, and the like. The automatic switch is operated when the automatic control operation of the thermal management system 1 is set or cancelled. The air conditioner switch is operated when the indoor evaporator 47 is requested to chill the blown air. The air volume setting switch is operated to manually set the air volume of the blower 62. The temperature setting switch is operated to set the target temperature Tset in the cabin.

Note that in the control device 70, a controller that controls various devices to be controlled connected to the output ports thereof is integrally configured. Therefore, a configuration (hardware and software) that controls the operation of each device to be controlled constitutes a controller that controls the operation of each device to be controlled.

For example, in the control device 70, a configuration that controls the refrigerant discharge capacity (specifically, the rotation speed of the compressor 41) of the compressor 41 constitutes a discharge performance controller 70a. In the control device 70, a configuration that controls the operations of various component devices constituting the refrigerant circuit switch unit constitutes a refrigerant circuit controller 70b. The component devices of the refrigerant circuit switch unit include the dehumidifying on-off valve 43a, the heating on-off valve 43b, the heating expansion valve 44a, the cooling expansion valve 44b, and the chilling expansion valve 44c.

In the control device 70, a configuration that controls the operations of various component devices constituting the circuit switch unit of the heating medium circuit 5 constitutes a heating medium circuit switch controller 70c. The component devices of the circuit switch unit include the first heating medium three-way valve 30a, the second heating medium three-way valve 30b, the third heating medium three-way valve 30c, the first heating medium on-off valve 31a, and the second heating medium on-off valve 31b. Further, the component devices may include the first water pump 23a, the second water pump 23b, and the third water pump 23c. The heating medium circuit switch controller 70c corresponds to an example of a circuit switch unit in the heating medium circuit 5.

In the thermal management system 1 according to the present embodiment, the refrigeration cycle 40 can switch to various refrigerant circuits by controlling the operations of various component devices of the refrigerant circuit switch unit. The various refrigerant circuits include a refrigerant circuit in a cooling mode, a refrigerant circuit in a heating mode, a refrigerant circuit in a series dehumidification heating mode, a refrigerant circuit in a parallel dehumidification heating mode, a refrigerant circuit in a chilling mode, and a refrigerant circuit in a cooling/chilling mode.

More specifically, when the refrigerant circuit is switched to the cooling mode, the control device 70 brings the heating expansion valve 44a into the fully opened state and brings the cooling expansion valve 44b into the throttling state where the refrigerant decompressing action is exerted. At this time, the control device 70 brings the chilling expansion valve 44c into the fully closed state. The control device 70 closes both the dehumidifying on-off valve 43a and the heating on-off valve 43b.

Accordingly, in the cooling mode, the refrigerant flows and circulates through the compressor 41, the water refrigerant heat exchanger 12, (the heating expansion valve 44a), the outdoor heat exchanger 46, the refrigerant check valve 45, the cooling expansion valve 44b, the indoor evaporator 47, the evaporation pressure regulating valve 48, the accumulator 49, and the compressor 41 in this order. In the cooling mode, water refrigerant heat exchanger 12 and outdoor heat exchanger 46 function as radiators, and indoor evaporator 47 functions as a heat absorber.

Next, the refrigerant circuit in the heating mode will be described. In the heating mode, the control device 70 brings the heating expansion valve 44a into the throttling state, and brings the cooling expansion valve 44b and the chilling expansion valve 44c into the fully closed state. The control device 70 closes dehumidifying on-off valve 43a and opens heating on-off valve 43b.

Accordingly, in the heating mode, the refrigerant flows and circulates through the compressor 41, the heating expansion valve 44a, the outdoor heat exchanger 46, the heating on-off valve 43b, the accumulator 49, and the compressor 41 in this order. In the heating mode, the water refrigerant heat exchanger 12 functions as a radiator, and outdoor heat exchanger 46 functions as a heat absorber.

Next, a refrigerant circuit in the series dehumidification heating mode will be described. In the series dehumidification heating mode, the control device 70 brings the heating on-off valve 43b and the cooling expansion valve 44b into the predetermined throttling states, and brings the chilling expansion valve 44c into the fully closed state. The control device 70 closes the dehumidifying on-off valve 43a and the heating on-off valve 43b.

Accordingly, in the series dehumidification heating mode, the refrigerant flows and circulates through the compressor 41, the water refrigerant heat exchanger 12, the heating expansion valve 44a, the outdoor heat exchanger 46, the refrigerant check valve 45, the cooling expansion valve 44b, the indoor evaporator 47, the evaporation pressure regulating valve 48, the accumulator 49, and the compressor 41 in this order.

In the series dehumidification heating mode, the water refrigerant heat exchanger 12 functions as a radiator, and the indoor evaporator 47 functions as a heat absorber. The outdoor heat exchanger 46 functions as a radiator when the saturation temperature of the refrigerant in the outdoor heat exchanger 46 is higher than the outside air temperature, and functions as a heat absorber when the saturation temperature of the refrigerant in the outdoor heat exchanger 46 is lower than the outside air temperature.

Next, a refrigerant circuit in the parallel dehumidification heating mode will be described. In the parallel dehumidification heating mode, the control device 70 brings the heating expansion valve 44a and the cooling expansion valve 44b into the predetermined throttling states, and brings the chilling expansion valve 44c into the fully closed state. The control device 70 fully opens the dehumidifying on-off valve 43a and the heating expansion valve 44a.

Accordingly, in the parallel dehumidification heating mode, the refrigerant flows and circulates through the compressor 41, the water refrigerant heat exchanger 12, the heating expansion valve 44a, the outdoor heat exchanger 46, the heating on-off valve 43b, the accumulator 49, and the compressor 41 in this order. At the same time, the refrigerant flows and circulates through the compressor 41, the water refrigerant heat exchanger 12, the dehumidifying on-off valve 43a, the cooling expansion valve 44b, the indoor evaporator 47, the evaporation pressure regulating valve 48, the accumulator 49, and the compressor 41 in this order. In the parallel dehumidification heating mode, water refrigerant heat exchanger 12 functions as a radiator, and outdoor heat exchanger 46 and indoor evaporator 47 function as heat absorbers.

Next, the refrigerant circuit in the chilling mode will be described. In the chilling mode, the control device 70 brings the heating expansion valve 44a into fully opened state and brings the chilling expansion valve 44c into the throttling state. At this time, the control device 70 brings the cooling expansion valve 44b into the fully closed state. The control device 70 closes both the dehumidifying on-off valve 43a and the heating on-off valve 43b.

Accordingly, in the chilling mode, the refrigerant flows and circulates through the compressor 41, the water refrigerant heat exchanger 12, (heating expansion valve 44a), the outdoor heat exchanger 46, the refrigerant check valve 45, the chilling expansion valve 44c, the chiller 22, the accumulator 49, and the compressor 41 in this order. In the chilling mode, the water refrigerant heat exchanger 12 and the outdoor heat exchanger 46 function as radiators, and the chiller 22 functions as a heat absorber.

Finally, the refrigerant circuit in the cooling/chilling mode will be described. In the case of the cooling/chilling mode, the control device 70 brings the heating expansion valve 44a into the fully opened state, and brings the cooling expansion valve 44b and the chilling expansion valve 44c into the predetermined throttling states. The control device 70 closes both the dehumidifying on-off valve 43a and the heating on-off valve 43b.

Accordingly, in the cooling/chilling mode, the refrigerant flows and circulates through the compressor 41, the water refrigerant heat exchanger 12, (the heating expansion valve 44a), the outdoor heat exchanger 46, the refrigerant check valve 45, the cooling expansion valve 44b, the indoor evaporator 47, the evaporation pressure regulating valve 48, the accumulator 49, and the compressor 41 in this order. At the same time, the refrigerant flows through and circulates through the compressor 41, the water refrigerant heat exchanger 12, (heating expansion valve 44a), the outdoor heat exchanger 46, refrigerant check valve 45, the chilling expansion valve 44c, the chiller 22, the accumulator 49, and the compressor 41 in this order. In the cooling/chilling mode, the water refrigerant heat exchanger 12 and the outdoor heat exchanger 46 function as radiators, and the indoor evaporator 47 and the chiller 22 function as heat absorbers.

Next, an operation mode of the thermal management system 1 configured as described above will be described with reference to FIGS. 5 to 10. The thermal management system 1 according to the present embodiment can switch between a plurality of types of operation modes in accordance with the state of the air conditioning in the cabin and the states of the heat generation device 16 and the battery 21.

Specifically, when the operation mode is switched, the operations of the flow rate adjustment unit 19, the first water pump 23a, the second water pump 23b, the third water pump 23c, the first heating medium three-way valve 30a, the second heating medium three-way valve 30b, the first heating medium on-off valve 31a, and the second heating medium on-off valve 31b are controlled.

In the following description, the first operation mode to the sixth operation mode will be described as operation modes of the thermal management system 1 according to the present embodiment. Since the operation mode of the refrigeration cycle 40 has already been described, the circuit configuration and the like of the heating medium circuit 5 will be mainly described in detail.

(1) First Operation Mode

The first operation mode is an operation mode executed by the thermal management system 1 when the waste heat of the heat generation device 16 and the battery 21 is utilized via the heating medium of the heating medium circuit 5 without operating the refrigeration cycle 40.

In the first operation mode, the control device 70 operates the first water pump 23a and the second water pump 23b, and stops the third water pump 23c. The control device 70 stops the operations of the heating device 13 and the refrigeration cycle 40 (that is, the compressor 41). Further, the control device 70 closes both the first heating medium on-off valve 31a and the second heating medium on-off valve 31b.

The control device 70 controls the operation of the first heating medium three-way valve 30a to communicate the flow inlet/outlet port of the heater core 11 with the flow inlet/outlet port of the first connection passage 25a, and to close the flow inlet/outlet port of the fifth connection portion 26e.

The control device 70 controls the operation of the second heating medium three-way valve 30b to communicate the flow inlet/outlet port of the first water pump 23a with the flow inlet/outlet port of the second connection portion 26b, and to close the flow inlet/outlet port of the third connection passage 25c.

Further, the control device 70 controls the operation of the third heating medium three-way valve 30c constituting the flow rate adjustment unit 19 to communicate the flow inlet/outlet port of the ninth connection portion 26i with the flow inlet/outlet port of the alternative passage 18, and to close the flow inlet/outlet port of the radiator 17.

Figure 5:
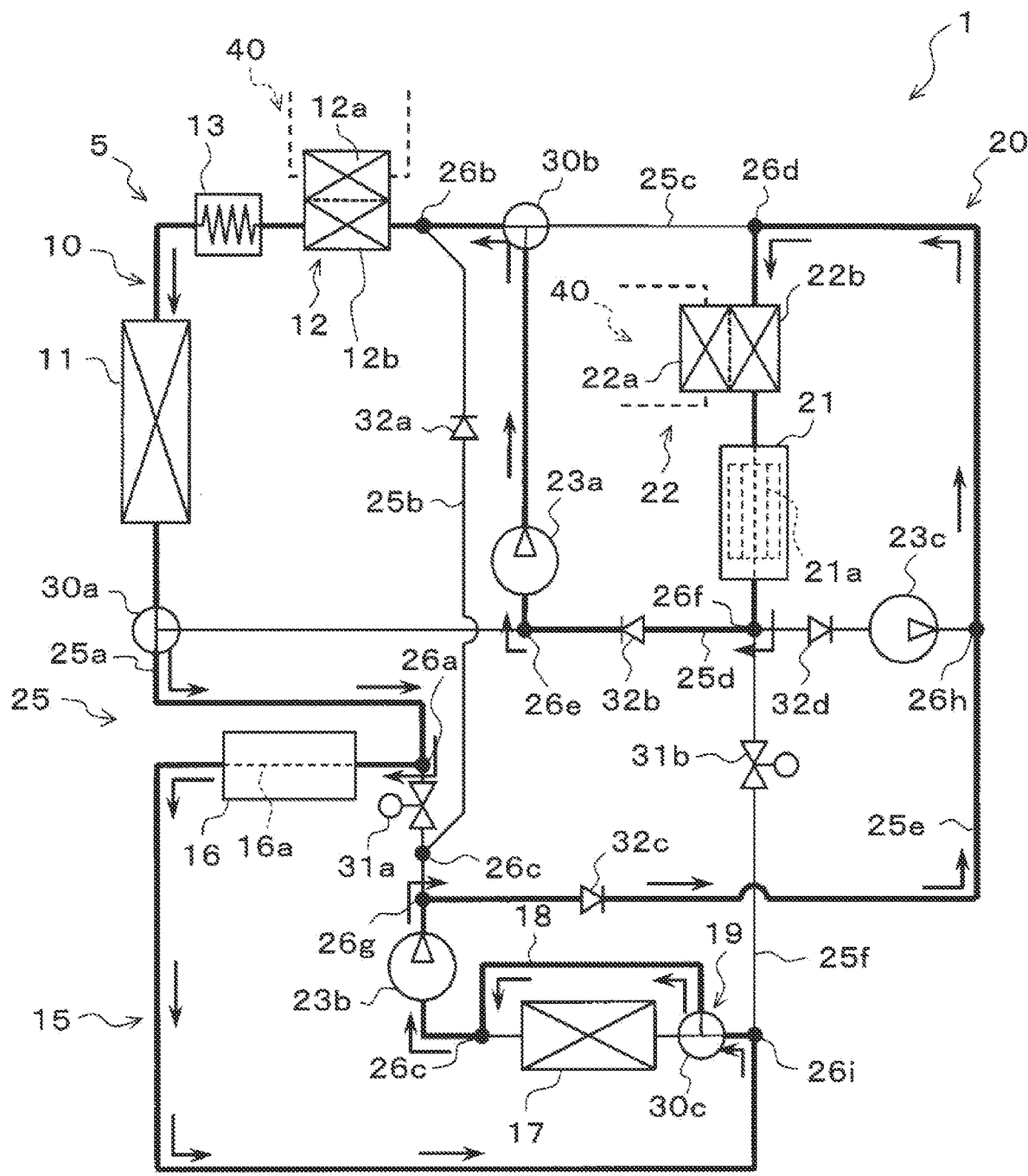
FIG. 5 is an explanatory diagram of a first operation mode of the thermal management system according to an embodiment.

Accordingly, in the heating medium circuit 5 in the first operation mode, the heating medium circulates as indicated by a thick arrow in FIG. 5. Specifically, in the first operation mode, the heating medium flows through the first water pump 23a, the second heating medium three-way valve 30b, the water refrigerant heat exchanger 12, the heating device 13, the heater core 11, the first heating medium three-way valve 30a, the heat generation device 16, the flow rate adjustment unit 19, and the second water pump 23b in this order. The heating medium discharged from the second water pump 23b flows through the second water pump 23b, the third heating medium check valve 32c, the chiller 22, the battery 21, the second heating medium check valve 32b, and the first water pump 23a in this order.

As can be seen from FIG. 5, in the first operation mode, the heating medium of the heating medium circuit 5 circulates so as to pass through the heat generation device 16, the battery 21, the heating device 13, and the heater core 11 via the high-temperature side heating medium circuit 10, the low-temperature side heating medium circuit 15, and the device heating medium circuit 20.

According to the circuit configuration of the heating medium circuit 5 in the first operation mode, the heating medium of the heating medium circuit 5 passes through the heating medium passage 16a of the heat generation device 16. At this time, the heating medium absorbs heat of the heat generation device 16 and flows out.

The heating medium flowing out of the heat generation device 16 reaches the suction port of the second water pump 23b via the alternative passage 18 at the flow rate adjustment unit 19. That is, the heating medium can store the waste heat absorbed from the heat generation device 16 since it detours around the radiator 17. When the temperature of the heating medium is too high, the flow rate ratio between the radiator 17 and the alternative passage 18 may be adjusted by the flow rate adjustment unit 19, and the excessive amount of heat may be radiated from the heating medium to the outside air.

The heating medium discharged from the second water pump 23b flows into the heating medium passage 21a of the battery 21 via the third heating medium check valve 32c and the chiller 22. When passing through the heating medium passage 21a of the battery 21, the heating medium exchanges heat with the battery 21 to adjust the temperature of the battery 21.

When flowing out of the heating medium passage 21a of the battery 21, the heating medium is sucked to the suction port of the first water pump 23a via the second heating medium check valve 32b. The heating medium discharged from the first water pump 23a flows into the heater core 11 via the second heating medium three-way valve 30b, the water refrigerant heat exchanger 12, and the heating device 13. The heating medium flowing into the heater core 11 radiates heat to the blown air blown into the cabin which is the space to be air-conditioned.

That is, according to the thermal management system 1 in the first operation mode, since the heating medium heated by the waste heat of the heat generation device 16 and the battery 21 circulates through the heater core 11, it is possible to realize heating of the interior of the cabin using the waste heat of the heat generation device 16 and the battery 21.

In the first operation mode, since the waste heat of the heat generation device 16 and the like is transferred to the heater core 11 by the circulation of the heating medium without operating the refrigeration cycle 40, the waste heat can be used for heating of the interior of the cabin without causing heat loss associated with heat exchange efficiency and the like.

As shown in FIG. 5, the third water pump 23c is not included in the circulation path of the heating medium in the first operation mode, and the third water pump 23c is in a stopped state. In other words, the circulation path of the heating medium in the first operation mode is configured so that the third water pump 23c is disengaged from the circulation path of the heating medium.

That is, in the first operation mode, the first water pump 23a and the second water pump 23b circulate the heating medium through the high-temperature side heating medium circuit 10, the low-temperature side heating medium circuit 15, and the device heating medium circuit 20. Therefore, according to the first operation mode, heating of the interior of the cabin using the waste heat of the heat generation device 16 or the like is performed while the refrigeration cycle 40 and the third water pump 23c are in the stopped state, so that energy saving in heating of the interior of the cabin can be achieved.

(2) Second Operation Mode

The second operation mode is executed by the thermal management system 1, for example, when heating the interior of the cabin while warming up the heat generation device 16 using the waste heat of the battery 21.

In the second operation mode, control device 70 operates the first water pump 23a and the second water pump 23b, and stops the third water pump 23c. The control device 70 causes the heating device 13 to generate heat with a predetermined calorific value and stops the operation of the refrigeration cycle 40. Further, the control device 70 opens both the first heating medium on-off valve 31a and the second heating medium on-off valve 31b.

The control device 70 controls the operation of the first heating medium three-way valve 30a to communicate the flow inlet/outlet port of the heater core 11 with the flow inlet/outlet port of the fifth connection portion 26e and to close the flow inlet/outlet port of the first connection passage 25a.

The control device 70 controls the operation of the second heating medium three-way valve 30b to communicate the flow inlet/outlet port of the first water pump 23a with the flow inlet/outlet port of the second connection portion 26b, and to close the flow inlet/outlet port of the third connection passage 25c.

Further, the control device 70 controls the operation of the third heating medium three-way valve 30c constituting the flow rate adjustment unit 19 to communicate the flow inlet/outlet port of the ninth connection portion 26i with the flow inlet/outlet port of the alternative passage 18, and to close the flow inlet/outlet port of the radiator 17.

Figure 6:
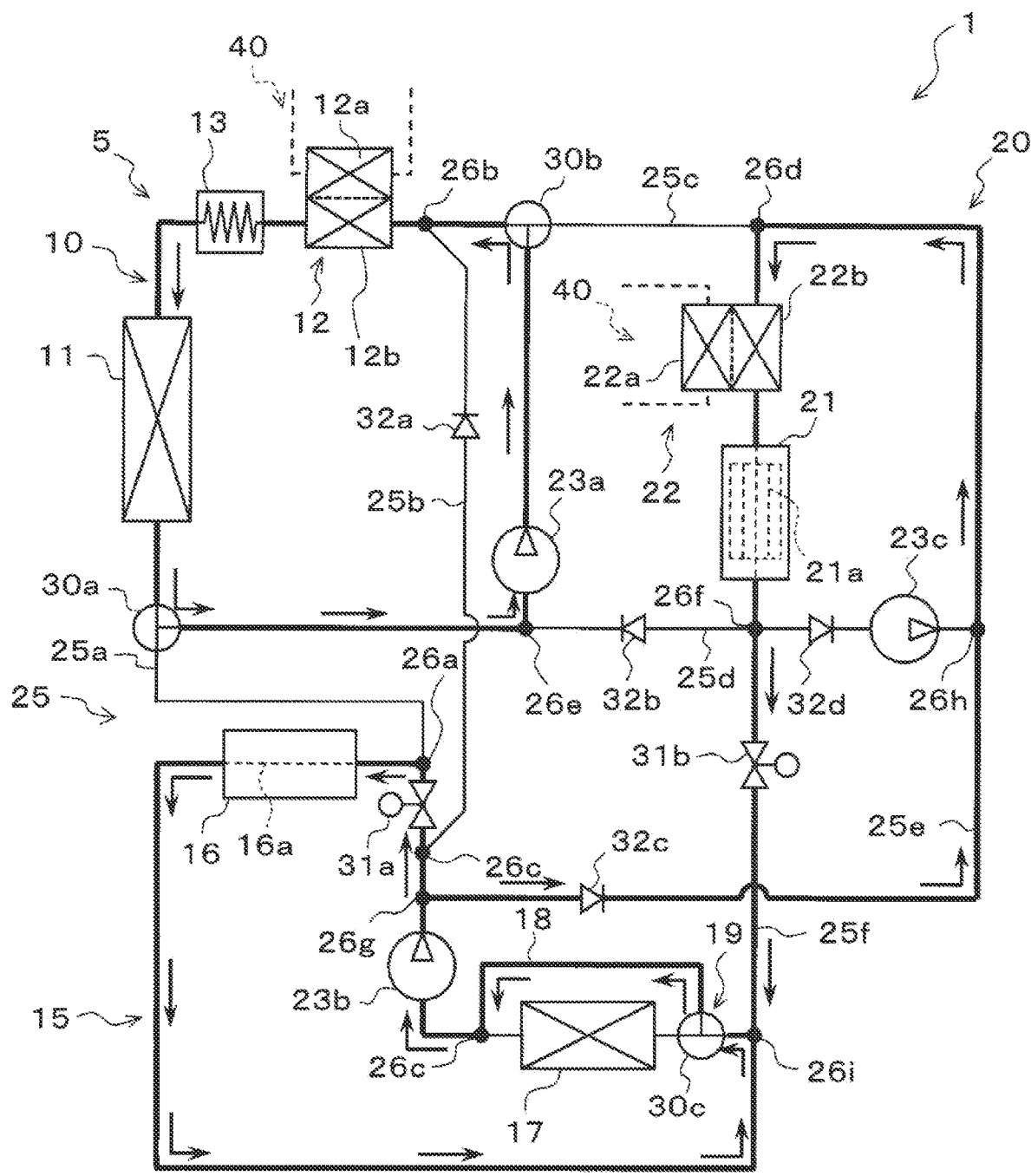
FIG. 6 is an explanatory diagram of a second operation mode of the thermal management system according to an embodiment.

Accordingly, in the heating medium circuit 5 in the second operation mode, the heating medium circulates as indicated by a thick arrow in FIG. 6. Specifically, in the second operation mode, the heating medium flows and circulates through the first water pump 23*a*, the second heating medium three-way valve 30*b*, the water refrigerant heat exchanger 12, the heating device 13, the heater core 11, the first heating medium three-way valve 30*a*, and the first water pump 23*a* in this order.

In the second operation mode, the heating medium flows and circulates through the second water pump 23*b*, the first heating medium on-off valve 31*a*, the heat generation device 16, the flow rate adjustment unit 19, and the second water pump 23*b* in this order. At the same time, the heating medium flows and circulates through the second water pump 23*b*, the third heating medium check valve 32*c*, the chiller 22, the battery 21, the second heating medium on-off valve 31*b*, the flow rate adjustment unit 19, and the second water pump 23*b* in this order.

As can be seen from FIG. 6, in the second operation mode, the heating medium in the heating medium circuit 5 circulates so as to pass through the water refrigerant heat exchanger 12, the heating device 13, and the heater core 11 in the high-temperature side heating medium circuit 10. The heating medium of the heating medium circuit 5 connects the low-temperature side heating medium circuit 15 and the device heating medium circuit 20 to form a circulation path in which the heat generation device 16, the battery 21, and the chiller 22 are connected in parallel with the flow of the heating medium passing through the second water pump 23*b*.

Therefore, in the high-temperature side heating medium circuit 10 in the second operation mode, the heating medium flowing out of the first water pump 23*a* is heated when passing through the water refrigerant heat exchanger 12 and the heating device 13. The heating medium flowing out of the heating device 13 radiates heat to the blown air at the heater core 11. Therefore, in the second operation mode, heating of the interior of the cabin can be performed by circulating the heating medium in the high-temperature side heating medium circuit 10.

In the second operation mode, the low-temperature side heating medium circuit 15 and the device heating medium circuit 20 are connected via the fifth connection passage 25*e* and the sixth connection passage 25*f*. The heating medium of the heating medium circuit 5 passes through the heating medium passage 21*a* of the battery 21 and passes through the heating medium passage 16*a* of the heat generation device 16. Therefore, the waste heat generated in the battery 21 can be transferred to the heat generation device 16 by the flow of the heating medium, and the heat generation device 16 can be warmed up.

(3) Third Operation Mode

The third operation mode is executed by the thermal management system 1, for example, when heating of the interior of the cabin together with the temperature adjustment of the heat generation device 16 and the battery 21 using the outside air heat radiation in the radiator 17 are performed.

In the third operation mode, the control device 70 operates the first water pump 23*a* and the second water pump 23*b*, and stops the third water pump 23*c*. The control device 70 causes the heating device 13 to generate heat with a predetermined calorific value and stops the operation of the refrigeration cycle 40 (that is, the compressor 41). Further, the control device 70 opens both the first heating medium on-off valve 31*a* and the second heating medium on-off valve 31*b*.

The control device 70 controls the operation of the first heating medium three-way valve 30*a* to communicate the flow inlet/outlet port of the heater core 11 with the flow inlet/outlet port of the fifth connection portion 26*e* and to close the flow inlet/outlet port of the first connection passage 25*a*.

The control device 70 controls the operation of the second heating medium three-way valve 30*b* to communicate the flow inlet/outlet port of the first water pump 23*a* with the flow inlet/outlet port of the second connection portion 26*b*, and to close the flow inlet/outlet port of the third connection passage 25*c*.

In addition, the control device 70 controls the operation of the third heating medium three-way valve 30*c* constituting the flow rate adjustment unit 19 to communicate the flow inlet/outlet port of the ninth connection portion 26*i* with the flow inlet/outlet port of the radiator 17 and to close the flow inlet/outlet port of the alternative passage 18.

Figure 7:
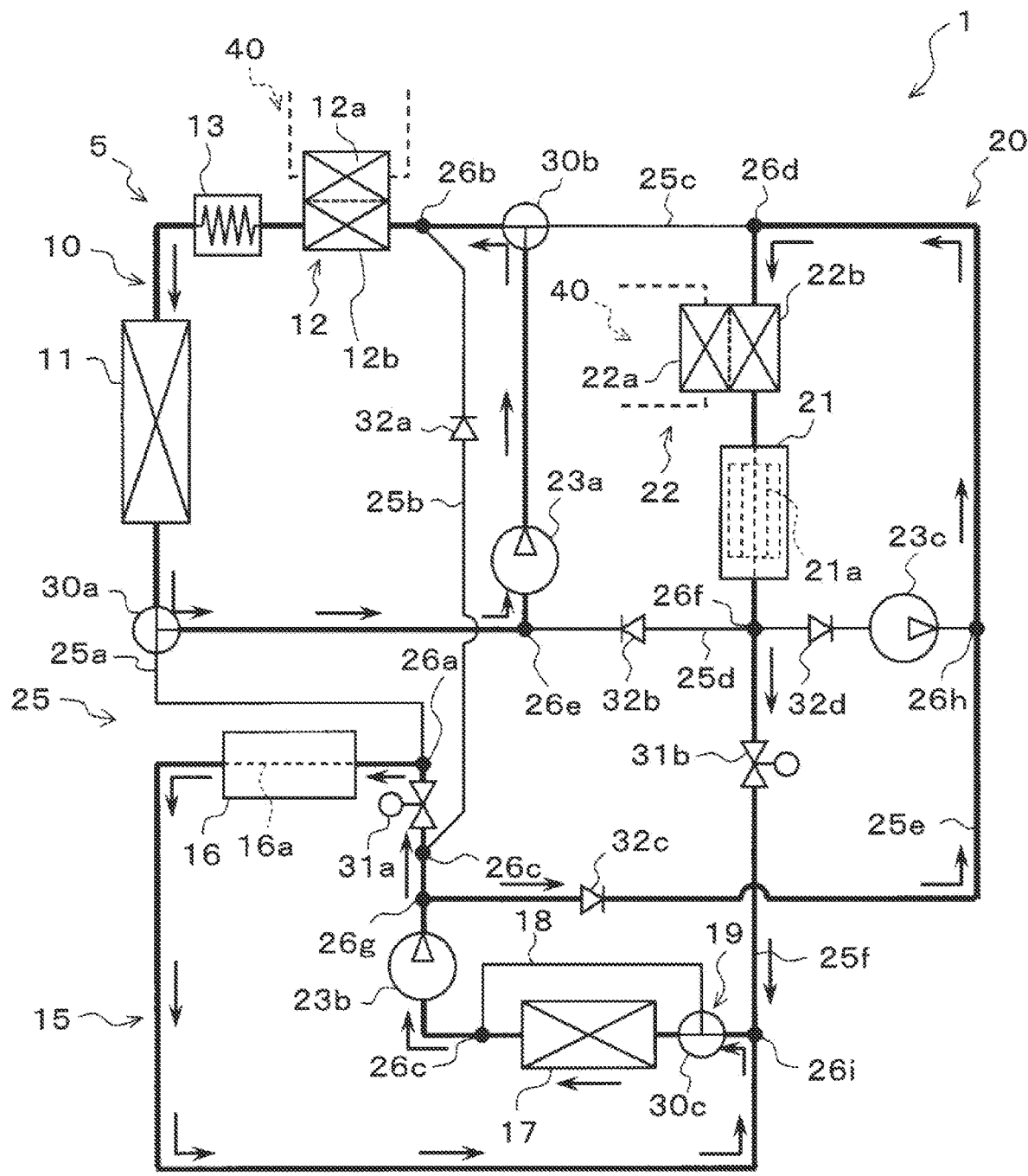
FIG. 7 is an explanatory diagram of a third operation mode of the thermal management system according to an embodiment.

Accordingly, in the heating medium circuit 5 in the third operation mode, the heating medium circulates as indicated by a thick arrow in FIG. 7. Specifically, in the third operation mode, the heating medium flows and circulates through the first water pump 23*a*, the second heating medium three-way valve 30*b*, the water refrigerant heat exchanger 12, the heating device 13, the heater core 11, the first heating medium three-way valve 30*a*, and the first water pump 23*a* in this order.

In the third operation mode, the heating medium flows and circulates through the second water pump 23*b*, the first heating medium on-off valve 31*a*, the heat generation device 16, the flow rate adjustment unit 19, the radiator 17, and the second water pump 23*b* in this order. At the same time, the heating medium flows and circulates through the second water pump 23*b*, the third heating medium check valve 32*c*, the chiller 22, the battery 21, the second heating medium on-off valve 31*b*, the flow rate adjustment unit 19, the radiator 17, and the second water pump 23*b* in this order.

As shown in FIG. 7, also in the third operation mode, the heating medium circulates so as to pass through the water refrigerant heat exchanger 12, the heating device 13, and the heater core 11 in the high-temperature side heating medium circuit 10. The heating medium of the heating medium circuit 5 connects the low-temperature side heating medium circuit 15 and the device heating medium circuit 20 to form a circulation path in which the heat generation device 16, the battery 21, and the chiller 22 are connected in parallel with the flow of the heating medium passing through the radiator 17.

Therefore, in the high-temperature side heating medium circuit 10 in the third operation mode, the heating medium heated when passing through the water refrigerant heat exchanger 12 and the heating device 13 radiates heat to the blown air at the heater core 11. Therefore, in the third operation mode, heating of the interior of the cabin can be performed by circulating the heating medium in the high-temperature side heating medium circuit 10.

In the third operation mode, the low-temperature side heating medium circuit 15 and the device heating medium circuit 20 are connected via the fifth connection passage 25*e* and the sixth connection passage 25*f*. The radiator 17 is included in a circulation path of the heating medium passing through the heating medium passage 21*a* of the battery 21 and a circulation path of the heating medium passing through the heating medium passage 16*a* of the heat generation device 16. Therefore, the waste heat generated in the battery 21 and the waste heat generated in the heat generation device 16 can be transferred to the radiator 17 by the flow of the heating medium, and can be radiated to the outside air. That is, the battery 21 and the heat generation device 16 can be cooled by heat dissipation to the outside air.

(4) Fourth Operation Mode

The fourth operation mode is executed by the thermal management system 1, for example, when the temperature of the battery 21 is adjusted and heating of the interior of the cabin is performed using the waste heat of the heat generation device 16.

In the fourth operation mode, control device 70 operates the first water pump 23a and the second water pump 23b, and stops the third water pump 23c. The control device 70 causes the heating device 13 to generate heat with a predetermined calorific value and operates the refrigeration cycle 40 in the above-described chilling mode. Further, the control device 70 closes both the first heating medium on-off valve 31a and the second heating medium on-off valve 31b.

The control device 70 controls the operation of the first heating medium three-way valve 30a to communicate the flow inlet/outlet port of the heater core 11 with the flow inlet/outlet port of the first connection passage 25a, and to close the flow inlet/outlet port of the fifth connection portion 26e.

The control device 70 controls the operation of the second heating medium three-way valve 30b to communicate the flow inlet/outlet port of the first water pump 23a with the flow inlet/outlet port of the third connection passage 25c, and to close the flow inlet/outlet port of the second connection portion 26b.

Further, the control device 70 controls the operation of the third heating medium three-way valve 30c constituting the flow rate adjustment unit 19 to communicate the flow inlet/outlet port of the ninth connection portion 26i with the flow inlet/outlet port of the alternative passage 18, and to close the flow inlet/outlet port of the radiator 17.

Figure 8:
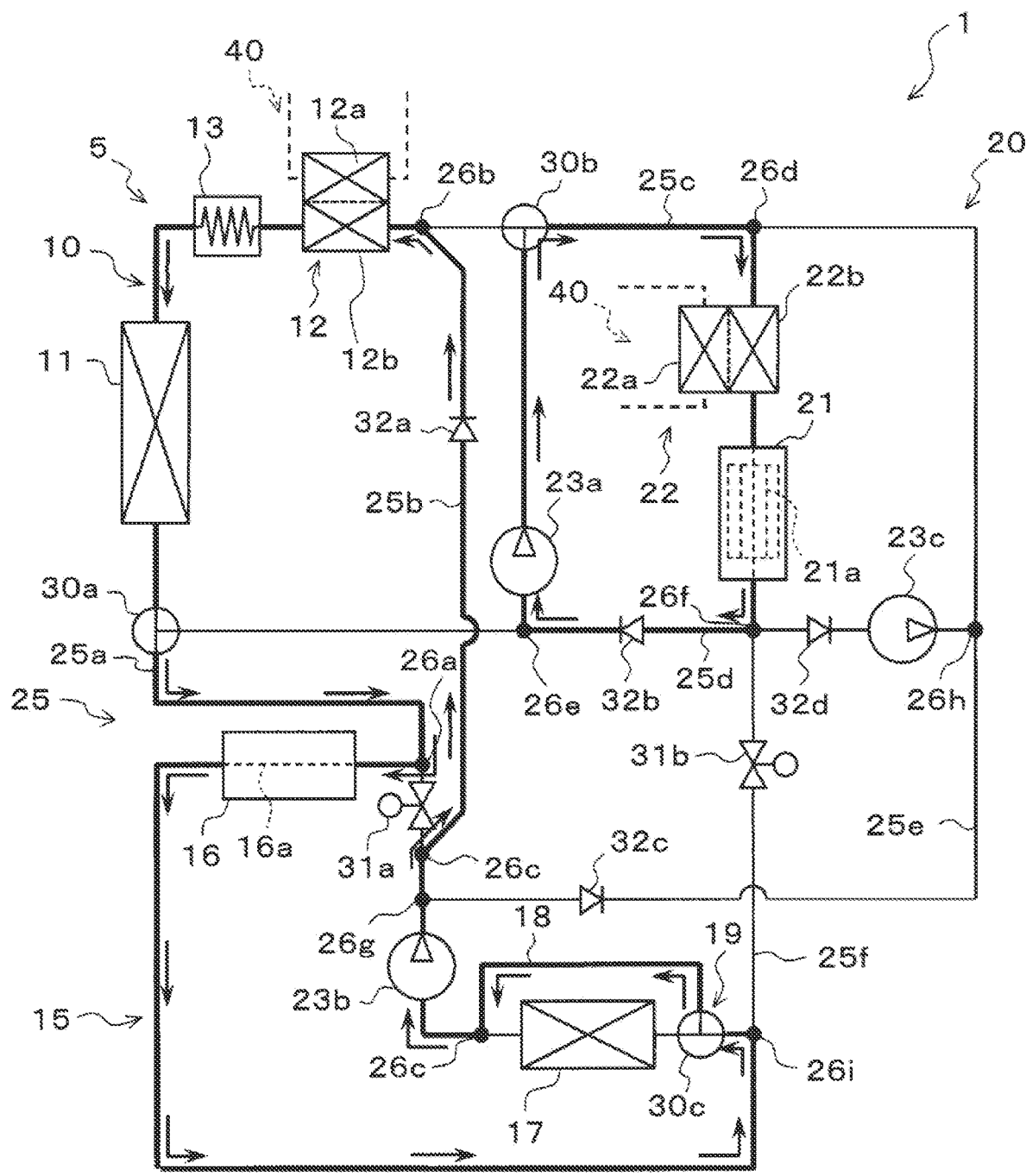
FIG. 8 is an explanatory diagram of a fourth operation mode of the thermal management system according to an embodiment.

Accordingly, in the heating medium circuit 5 in the fourth operation mode, the heating medium circulates as indicated by a thick arrow in FIG. 8. Specifically, in the fourth operation mode, the heating medium flows and circulates through the second water pump 23b, the first heating medium check valve 32a, the water refrigerant heat exchanger 12, the heating device 13, the heater core 11, the first heating medium three-way valve 30a, the heat generation device 16, the flow rate adjustment unit 19, and the second water pump 23b in this order.

In the fourth operation mode, the heating medium flows and circulates through the first water pump 23a, the second heating medium three-way valve 30b, the chiller 22, the battery 21, the second heating medium check valve 32b, and the first water pump 23a in this order.

As shown in FIG. 8, in the fourth operation mode, the high-temperature side heating medium circuit 10 and the low-temperature side heating medium circuit 15 are connected via the first connection passage 25a and the second connection passage 25b. The heating medium flowing out of the heating medium passage 16a of the heat generation device 16 flows into the heater core 11 via the water refrigerant heat exchanger 12 and the heating device 13, and dissipates heat to the blown air. Therefore, in the fourth operation mode, the heating medium is circulated in the high-temperature side heating medium circuit 10 and the low-temperature side heating medium circuit 15, whereby it is possible to realize heating of the interior of the cabin using the waste heat of the heat generation device 16.

In the heating medium circuit 5 in the fourth operation mode, the heating medium flowing out of the chiller 22 circulates through the heating medium passage 21a of the battery 21. Therefore, in the fourth operation mode, since the heating medium cooled by the chiller 22 can flow through the heating medium passage 21a of the battery 21, the temperature of the battery 21 can be adjusted.

(5) Fifth Operation Mode

The fifth operation mode is executed by the thermal management system 1, for example, when the temperature adjustment of the heat generation device 16, the temperature adjustment of the battery 21, and heating of the interior of the cabin are independently performed.

In the fifth operation mode, the control device 70 operates the first water pump 23a, the second water pump 23b, and the third water pump 23c so as to exert the respective predetermined pressure feeding capability. The control device 70 causes the heating device 13 to generate heat with a predetermined calorific value and operates the refrigeration cycle 40 in the above-described chilling mode. Further, the control device 70 opens the first heating medium on-off valve 31a and closes the second heating medium on-off valve 31b.

The control device 70 controls the operation of the first heating medium three-way valve 30a to communicate the flow inlet/outlet port of the heater core 11 with the flow inlet/outlet port of the fifth connection portion 26e and to close the flow inlet/outlet port of the first connection passage 25a.

The control device 70 controls the operation of the second heating medium three-way valve 30b to communicate the flow inlet/outlet port of the first water pump 23a with the flow inlet/outlet port of the second connection portion 26b, and to close the flow inlet/outlet port of the third connection passage 25c.

In addition, the control device 70 controls the operation of the third heating medium three-way valve 30c constituting the flow rate adjustment unit 19 to communicate the flow inlet/outlet port of the ninth connection portion 26i with the flow inlet/outlet port of the radiator 17 and to close the flow inlet/outlet port of the alternative passage 18.

Figure 9:
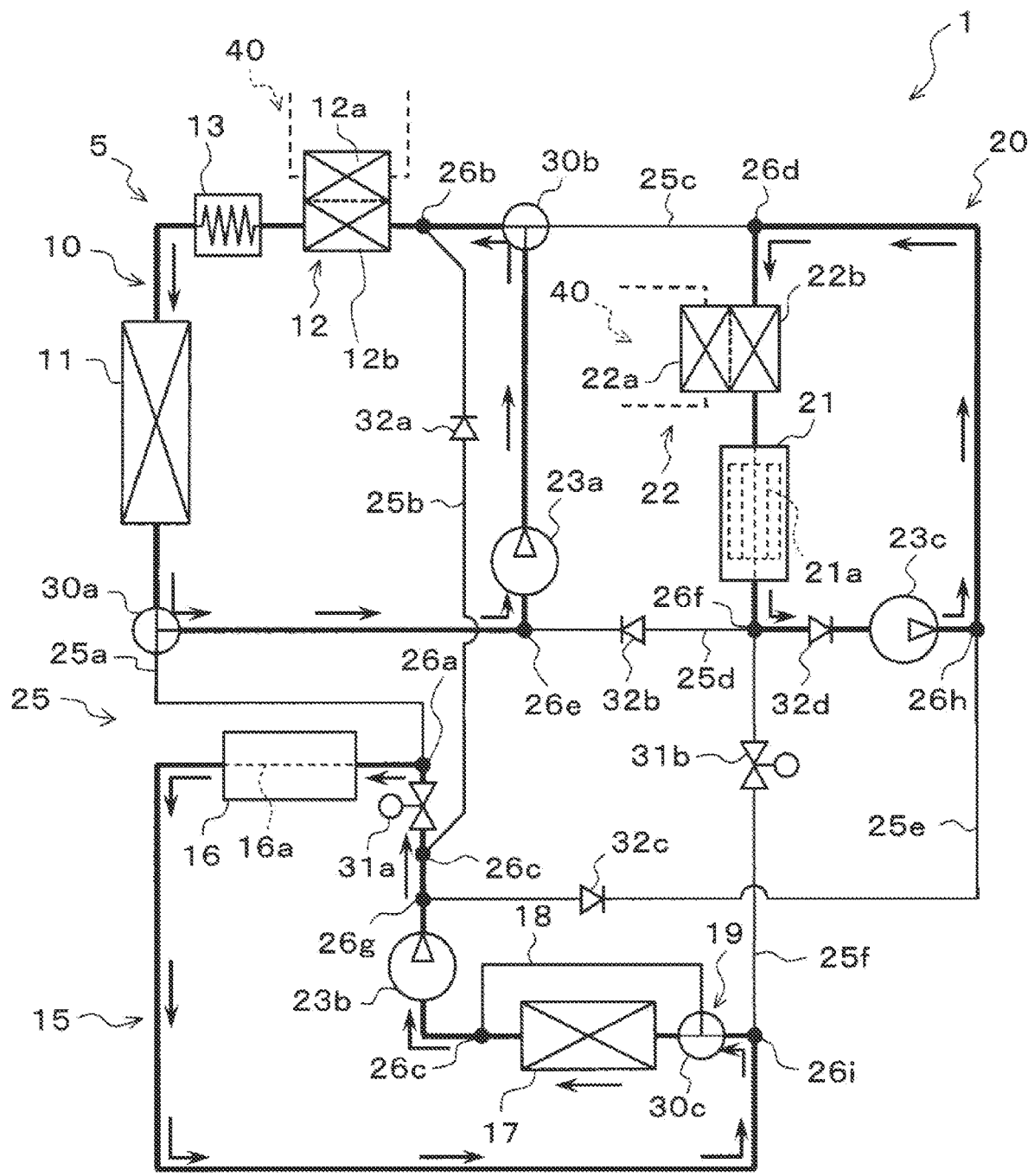
FIG. 9 is an explanatory diagram of a fifth operation mode of the thermal management system according to an embodiment.

Accordingly, in the heating medium circuit 5 in the fifth operation mode, the heating medium circulates as indicated by a thick arrow in FIG. 9. Specifically, in the high-temperature side heating medium circuit 10 in the fifth operation mode, the heating medium flows and circulates through the first water pump 23a, the second heating medium three-way valve 30b, the water refrigerant heat exchanger 12, the heating device 13, the heater core 11, the first heating medium three-way valve 30a, and the first water pump 23a in this order.

In the low-temperature side heating medium circuit 15 in the fifth operation mode, the heating medium flows and circulates through the second water pump 23b, the first heating medium on-off valve 31a, the heat generation device 16, the flow rate adjustment unit 19, the radiator 17, and the second water pump 23b in this order. At the same time, in the device heating medium circuit 20 in the fifth operation mode, the heating medium flows and circulates through the third water pump 23c, the chiller 22, the battery 21, the fourth heating medium check valve 32d, and the third water pump 23c in this order. That is, in the fifth operation mode, the heating medium circulates independently in each of the high-temperature side heating medium circuit 10, the low-temperature side heating medium circuit 15, and the device heating medium circuit 20.

As shown in FIG. 9, in the high-temperature side heating medium circuit 10 in the fifth operation mode, the heating medium that has passed through the water refrigerant heat exchanger 12 and the heating device 13 circulates so as to pass through the heater core 11. Therefore, the heating medium heated by the heating device 13 or the like dissipates heat to the blown air when passing through the heater core 11. In other words, it is possible to realize heating of the interior of the cabin using the heating device 13 or the like.

In the low-temperature side heating medium circuit 15 in the fifth operation mode, the heating medium that passed through the heat generation device 16 circulates via the flow rate adjustment unit 19. Since the flow rate adjustment unit 19 can adjust the flow rate of the heating medium of the radiator 17 and the flow rate of the heating medium of the alternative passage 18, the radiator 17 can adjust the amount of heat radiated from the heating medium circulating in the device heating medium circuit 20 to the outside air. That is, the temperature of the heat generation device 16 can be adjusted by the radiator 17.

In the device heating medium circuit 20 in the fifth operation mode, the heating medium that passed through the chiller 22 absorbs heat from the battery 21 when flowing through the heating medium circuit 5 of the battery 21. In the fifth operation mode, since the refrigeration cycle 40 operates in the chilling mode, the temperature of the battery 21 can be appropriately adjusted.

Further, in the fifth operation mode, the circulation of the heating medium in the high-temperature side heating medium circuit 10, the low-temperature side heating medium circuit 15, and the device heating medium circuit 20 is independent from each other. Therefore, it is possible to take appropriate measures according to the respective applications while suppressing mutual influences with respect to heating of the interior of the cabin using the heating device 13 and the like, temperature adjustment of the heat generation device 16, and temperature adjustment of the battery 21.

(6) Sixth Operation Mode

The sixth operation mode is executed by the thermal management system 1, for example, when the battery 21 is warmed while heating of the interior of the cabin using the heating device 13 or the like is performed.

In the sixth operation mode, the control device 70 operates the first water pump 23a so as to exhibit the predetermined pressure feeding capability, and stops the second water pump 23b and the third water pump 23c. The control device 70 causes the heating device 13 to generate heat with a predetermined calorific value and stops the operation of the refrigeration cycle 40. Further, the control device 70 closes the first heating medium on-off valve 31a and the second heating medium on-off valve 31b.

The control device 70 controls the operation of the first heating medium three-way valve 30a to communicate the flow inlet/outlet port of the heater core 11 with the flow inlet/outlet port of the fifth connection portion 26e and to close the flow inlet/outlet port of the first connection passage 25a.

The control device 70 controls the operation of the second heating medium three-way valve 30b to communicate the flow inlet/outlet port of the first water pump 23a, the flow inlet/outlet port of the second connection portion 26b, and the flow inlet/outlet port of the third connection passage 25c. The operation mode of the flow rate adjustment unit 19 in the sixth operation mode can be arbitrarily determined.

Figure 10:
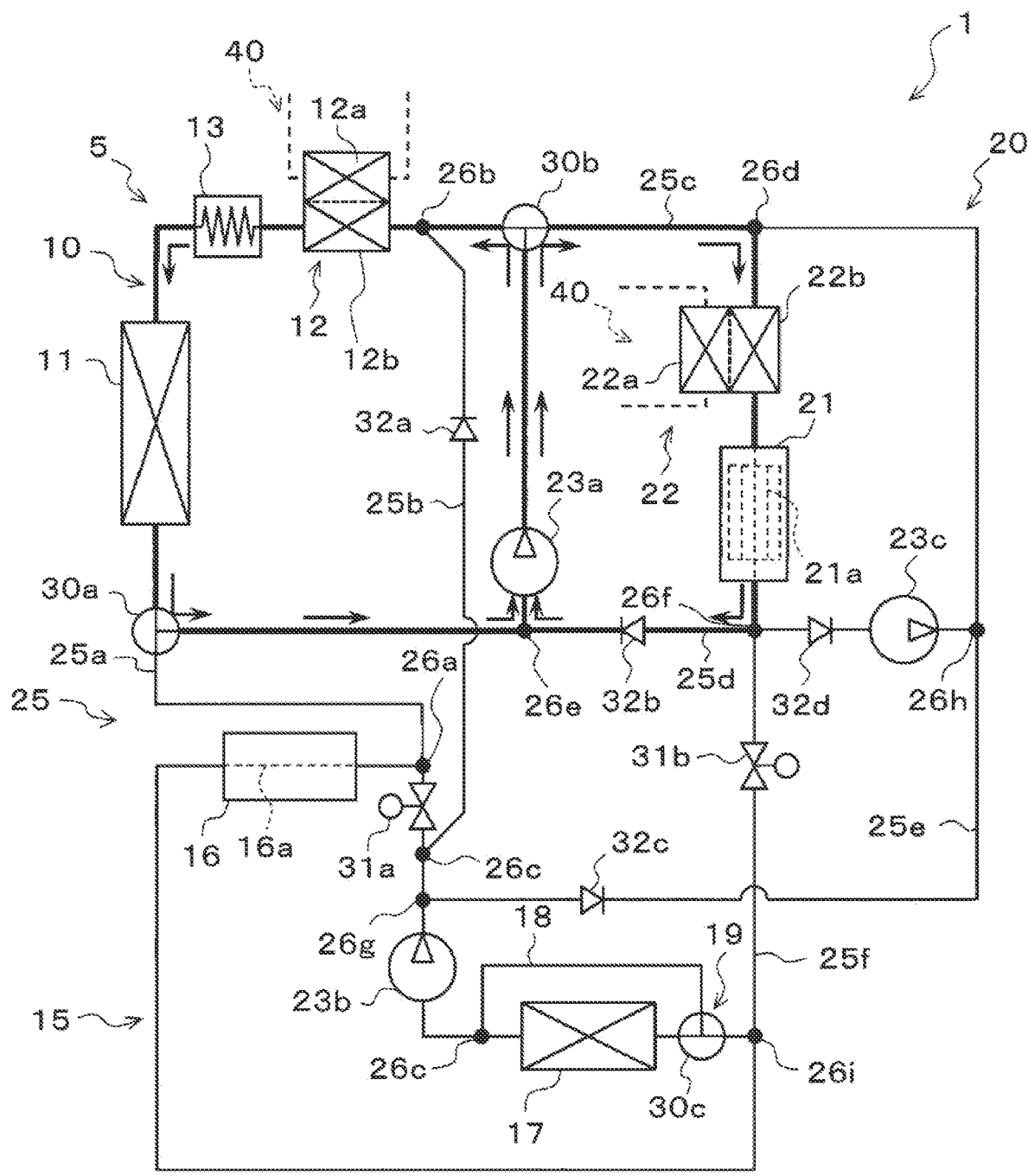
FIG. 10 is an explanatory diagram of a sixth operation mode of the thermal management system according to an embodiment.

Accordingly, in the heating medium circuit 5 in the sixth operation mode, the heating medium circulates as indicated by a thick arrow in FIG. 10. Specifically, in the high-temperature side heating medium circuit 10 in the sixth operation mode, the heating medium flows and circulates through the first water pump 23a, the second heating medium three-way valve 30b, the water refrigerant heat exchanger 12, the heating device 13, the heater core 11, the first heating medium three-way valve 30a, and the first water pump 23a in this order. At the same time, the heating medium flows and circulates through the first water pump 23a, the second heating medium three-way valve 30b, the chiller 22, the battery 21, the second heating medium check valve 32b, and the first water pump 23a in this order.

That is, in the sixth operation mode, the high-temperature side heating medium circuit 10 and the device heating medium circuit 20 are connected by the third connection passage 25c and the fourth connection passage 25d. The battery 21 and the heating device 13 are connected in parallel, and the heater core 11, and the chiller 22 and the battery 21 are connected in parallel with respect to the flow of the heating medium discharged from the first water pump 23a.

As shown in FIG. 10, in the sixth operation mode, the high-temperature side heating medium circuit 10 and the device heating medium circuit 20 are connected, and part of the heating medium discharged from the first water pump 23a is circulated so as to pass through the heater core 11 via the water refrigerant heat exchanger 12 and the heating device 13.

Accordingly, in the sixth operation mode, the heating medium flowing out of the water refrigerant heat exchanger 12 and the heating device 13 flows into heater core 11 and radiates heat to the blown air. Therefore, in the sixth operation mode, it is possible to realize heating of the interior of the cabin using the heating device 13 or the like.

In the heating medium circuit 5 in the sixth operation mode, the other part of the heating medium discharged from the first water pump 23a flows and circulates through the heating medium passage 21a of the battery 21 via the chiller 22. Therefore, in the sixth operation mode, the heating medium heated by the heating device 13 or the like can be circulated through the heating medium passage 21a of the battery 21, and the battery can be warmed up using the heat of the heating medium.

As described above, the thermal management system 1 according to the present embodiment includes the high-temperature side heating medium circuit 10, the low-temperature side heating medium circuit 15, the device heating medium circuit 20, the circuit connection portion 25, and the heating medium circuit switch controller 70c.

As illustrated in FIGS. 6 to 8, according to the thermal management system 1, the heating medium flowing through the low-temperature side heating medium circuit 15 can be circulated through any one of the high-temperature side heating medium circuit 10 and the device heating medium circuit 20 via the circuit connection portion 25. As a result, the thermal management system 1 can transfer waste heat of the heat generation device 16 of the low-temperature side heating medium circuit 15 by the heating medium and use the waste heat for heating of the interior of the cabin from the high-temperature side heating medium circuit 10 and warming the battery 21 which is a target device of the device heating medium circuit 20.

The thermal management system 1 can realize the first operation mode in which the heating medium is circulated by connecting the high-temperature side heating medium circuit 10, the low-temperature side heating medium circuit 15, and the device heating medium circuit 20 via the circuit connection portion 25. As illustrated in FIG. 5, in the first operation mode, the heating medium circulates through the heat generation device 16, the heating medium passage 21a of the battery 21, the heating device 13, and the heater core 11. Therefore, in the thermal management system 1 in the first operation mode, it is possible to realize temperature adjustment of the heat generation device 16 and the battery 21 together with heating of the interior of the cabin using waste heat of the heat generation device 16 and the like.

In the thermal management system 1, heat transfer between the high-temperature side heating medium circuit 10 and the like is realized by circulation of the heating medium without operating the refrigeration cycle 40. That is, since it is not necessary to perform heat exchange between the heating medium and the refrigerant, heat loss due to heat exchange efficiency or the like does not occur. As a result, according to the thermal management system 1, it is possible to achieve energy saving in heating of the interior of the cabin and temperature adjustment of the heat generation device and the target equipment.

Further, as shown in FIG. 5, the circulation path of the heating medium in the first operation mode is configured to pass through the first water pump 23a and the second water pump 23b, and the third water pump 23c is disengaged from the circulation path. In other words, it can be said that the third water pump 23c is not disposed in the circulation path of the heating medium in the first operation mode.

Therefore, regarding the circulation of the heating medium in the first operation mode, by configuring the circulation path so as not to pass through the third water pump 23c, the flow path resistance derived from the third water pump 23c can be reduced, and the flow path resistance regarding the circulation of the heating medium can be suppressed as low as possible.

In the first operation mode, the heating medium circulates through the high-temperature side heating medium circuit 10, the low-temperature side heating medium circuit 15, and the device heating medium circuit 20, so that the circulation path is long and the pressure feeding capability of the heating medium is also required. As shown in FIG. 5, since the first water pump 23a and the second water pump 23b are disposed in the circulation path in the first operation mode, it is possible to sufficiently secure the pressure feeding capability required for circulation of the heating medium in the first operation mode.

Further, the thermal management system 1 according to the present embodiment can be further switched to the fifth operation mode. As shown in FIG. 9, in the fifth operation mode, the heating medium is circulated independently in the high-temperature side heating medium circuit 10, the low-temperature side heating medium circuit 15, and the device heating medium circuit 20, so that the circulation of the heating medium does not affect each other.

As a result, heating of the interior of the cabin by the high-temperature side heating medium circuit 10, temperature adjustment of the heat generation device 16 in the low-temperature side heating medium circuit 15, and temperature adjustment of the battery 21 in the device heating medium circuit 20 can be executed in parallel in a manner suitable for each circuit.

The thermal management system 1 can switch to the fourth operation mode by controlling the operation of the first heating medium three-way valve 30a and the like constituting the circuit switch unit. As illustrated in FIG. 8, the heating medium is circulated so as to pass through the heater core 11 of the high-temperature side heating medium circuit 10 and the heat generation device 16 of the low-temperature side heating medium circuit 15 via the first connection passage 25a and the second connection passage 25b constituting the circuit connection portion 25. In the fourth operation mode, the heating medium can be circulated independently in the device heating medium circuit 20.

As a result, heating of the interior of the cabin using the waste heat of the heat generation device 16 by the high-temperature side heating medium circuit 10 and the low-temperature side heating medium circuit 15 and temperature adjustment of the battery 21 in the device heating medium circuit 20 can be executed in parallel.

The thermal management system 1 can switch to the second operation mode by controlling the operation of the first heating medium three-way valve 30a and the like constituting the circuit switch unit. As illustrated in FIG. 6, the heating medium is circulated so as to pass through the heat generation device 16 of the low-temperature side heating medium circuit 15 and the battery 21 of the device heating medium circuit 20 via the fifth connection passage 25e and the sixth connection passage 25f constituting the circuit connection portion 25. In the second operation mode, the heating medium can be circulated independently in the high-temperature side heating medium circuit 10.

As a result, in the thermal management system 1, the low-temperature side heating medium circuit 15 and the device heating medium circuit 20 can warm up the battery 21 using the waste heat of the heat generation device 16 and adjust the temperature of the heat generation device 16 using the waste heat of the battery 21. In the high-temperature side heating medium circuit 10, the heating medium circulates through the heating device 13 and the heater core 11, so that heating of the interior of the cabin using the heating device 13 can be executed.

Furthermore, the thermal management system 1 can switch to the sixth operation mode by controlling the operation of the first heating medium three-way valve 30a and the like constituting the circuit switch unit. As shown in FIG. 10, in the sixth operation mode, the heating medium is circulated so as to pass through the heater core 11 and the heating device 13 of the high-temperature side heating medium circuit 10 and the battery 21 of the device heating medium circuit 20 via the third connection passage 25c and the fourth connection passage 25d constituting the circuit connection portion 25. As a result, the thermal management system 1 can realize heating of the interior of the cabin and warming of the battery 21 in parallel using the heating device 13 of the high-temperature side heating medium circuit 10 as a heat source.

The circuit switch unit of the thermal management system 1 according to the present embodiment includes the first heating medium three-way valve 30a, the second heating medium three-way valve 30b, the first heating medium on-off valve 31a, and the second heating medium on-off valve 31b. With the simple configuration of the two heating medium three-way valves and the two heating medium on-off valves, the circulation path of the heating medium in the thermal management system 1 can be switched to various modes, and it is possible to realize the first operation mode to the sixth operation mode.

The present disclosure is not limited to the above-described embodiments, and can be variously modified as follows without departing from the gist of the present disclosure. In addition, the means disclosed in each of the above embodiments may be appropriately combined within a feasible range.

In the above-described embodiment, an example is described in which the thermal management system 1 according to the present disclosure is applied to a vehicle air conditioner with an in-vehicle device cooling function, but the application of the thermal management system 1 is not limited thereto. The thermal management system 1 is not limited to the application to a vehicle, and may be applied to a stationary air conditioner or the like. For example, the present invention may be applied to an air conditioner with a server cooling function that performs air conditioning in a room in which a server (computer) is accommodated while appropriately adjusting the temperature of the server.

In the heating medium circuit of the thermal management system, the heat generation device 16 includes the plurality of component devices. However, the heating medium passages 16a of the component devices in the heat generation device 16 may be directly connected to each other in series or in parallel. Alternatively, the heat generation device 16 may be a single component device.

In the above-described embodiment, the first heating medium three-way valve 30a, the second heating medium three-way valve 30b, the first heating medium on-off valve 31a, and the second heating medium on-off valve 31b are used as the circuit switch unit in the heating medium circuit 5, but the present invention is not limited thereto. As long as the circuit configuration in the heating medium circuit 5 can be switched, another configuration such as a combination of a plurality of on-off valves can be used.

Further, in the above-described embodiment, the example in which the ethylene glycol aqueous solution is used as the heating medium of the heating medium circuit 5 is described, but the heating medium is not limited thereto. For example, a solution containing dimethylpolysiloxane, nano-fluid, or the like, antifreeze liquid, or the like can be employed as the heating medium. Furthermore, it is also possible to use an insulating liquid medium such as oil as the heating medium.

The configuration of the refrigeration cycle 40 in the present disclosure is not limited to the above embodiment. For example, an outdoor heat exchanger having a modulator may be used as the outdoor heat exchanger 46 constituting the refrigeration cycle 40. Similarly, as the water refrigerant heat exchanger 12, the water refrigerant heat exchanger 12 having a liquid storage tank may be employed.

In the above-described embodiment, the example in which R1234yf is used as the refrigerant is described, but the refrigerant is not limited thereto. For example, R134a, R600a, R410A, R404A, R32, R407C, or the like may be used. Alternatively, a mixed refrigerant obtained by mixing a plurality of kinds of these refrigerants or the like may be used.

In the first operation mode of the above-described embodiment, as shown in FIG. 5, the third water pump 23c is configured to be disengaged from the circulation path of the heating medium, but the configuration of the circulation path of the heating medium in the first operation mode is not limited thereto. One of the first water pump 23a to the third water pump 23c may be disengaged from the circulation path of the heating medium in the first operation mode, and the first water pump 23a may be disengaged or the second water pump 23b may be disengaged.

Although the present disclosure is described in accordance with the embodiments, it is understood that the present disclosure is not limited to the embodiments and structures thereof. The present disclosure also includes various modifications and alterations within an equivalent range. In addition, various combinations and modes, and other combinations and modes including only one element, more elements, or less elements are also within the scope and idea of the present disclosure.

What is claimed is:

1. A thermal management system comprising:
a high-temperature side heating medium circuit in which a heating unit heats a heating medium, a heater core that radiates heat of the heating medium to air blown to a space to be air-conditioned, and a first heating medium pump that pumps the heating medium are connected so that the heating medium is allowed to circulate therethrough;
a low-temperature side heating medium circuit in which a radiator that radiates heat of the heating medium to outside air, a heat generation device generates heat in accordance with an operation and whose temperature is adjusted by heat of the heating medium, and a second heating medium pump that pumps the heating medium are connected so that the heating medium is allowed to circulate therethrough;
a device heating medium circuit in which a device heat exchange unit exchanges heat between a target device to be subjected to temperature adjustment and the heating medium, the device heat exchange unit being connected so that the heating medium is allowed to flow in and out, and a third heating medium pump that pumps the heating medium are connected so that the heating medium is allowed to circulate therethrough;
a circuit connection portion that connects the high-temperature side heating medium circuit, the low-temperature side heating medium circuit, and the device heating medium circuit so that the heating medium is allowed to flow in and out; and
a circuit switch unit switches a flow of the heating medium in the high-temperature side heating medium circuit, the low-temperature side heating medium circuit, the device heating medium circuit, and the circuit connection portion, wherein
the circuit switch unit switches between
an operation mode in which the heating medium that passed through the low-temperature side heating medium circuit is circulated through any one of the high-temperature side heating medium circuit and the device heating medium circuit via the circuit connection portion and
an operation mode in which the high-temperature side heating medium circuit, the low-temperature side heating medium circuit, and the device heating medium circuit are connected via the circuit connection portion, and the heating medium is circulated through the heat generation device, the device heat exchange unit, the heating unit, and the heater core, and
a circulation path of the heating medium in the operation mode in which the high-temperature side heating medium circuit, the low-temperature side heating medium circuit, and the device heating medium circuit are connected via the circuit connection portion, and the heating medium is circulated through the heat generation device, the device heat exchange unit, the heating unit, and the heater core is configured so that any one of the first heating medium pump, the second heating medium pump, and the third heating medium pump is disengaged.

2. The thermal management system according to claim 1, wherein the circuit switch unit switches to an operation mode in which the heating medium is independently circulated through the high-temperature side heating medium circuit, the low-temperature side heating medium circuit, and the device heating medium circuit.

3. The thermal management system according to claim 1, wherein in an operation mode in which the heating medium that passed through the low-temperature side heating medium circuit is circulated through the high-temperature side heating medium circuit via the circuit connection portion, the circuit switch unit switches so that the heating medium is circulated through the heat generation device, the heating unit, and the heater core.

4. The thermal management system according to claim 1, wherein in the operation mode in which the heating medium that passed through the low-temperature side heating medium circuit is circulated through the device heating medium circuit via the circuit connection portion, the circuit switch unit switches so that the heating medium is circulated through the heat generation device and the device heat exchange unit.

5. The thermal management system according to claim 1, wherein when the heating medium that passed through the high-temperature side heating medium circuit circulates through the device heating medium circuit via the circuit connection portion, the circuit switch unit switches to an operation mode in which the heating medium is circulated through the heating unit, the heater core, and the device heat exchange unit.

6. The thermal management system according to claim 1, wherein
the circuit switch unit includes
a first heating medium three-way valve that switches between a state where the heating medium is circulated in the high-temperature side heating medium circuit and a state where the heating medium is allowed to flow in and out between the high-temperature side heating medium circuit and the low-temperature side heating medium circuit,
a second heating medium three-way valve that switches between a state where the heating medium is circulated in the high-temperature side heating medium circuit and a state where the heating medium is allowed to flow in and out between the high-temperature side heating medium circuit and the device heating medium circuit,
a first heating medium on-off valve that switches a flow of the heating medium in the low-temperature side heating medium circuit, and
a second heating medium on-off valve that switches a flow of the heating medium in the device heating medium circuit.

7. The thermal management system according to claim 1, wherein
the heating unit includes at least one of a heat exchanger or an electric heater.

8. The thermal management system according to claim 1, wherein
the heat generation device is one of a motor generator, a power control unit and a control device for an advanced drive assistance system.

9. The thermal management system according to claim 1, wherein
the device heat exchange unit includes a heating medium passage.

10. The thermal management system according to claim 6, further comprising:
a processor and a memory configured to control the first heating medium three-way valve, the second heating medium three-way valve, the first heating medium on-off valve, and the second heating medium on-off valve so as to change the operation modes.

11. A thermal management system comprising:
a high-temperature side heating medium circuit in which a first heater heats a heating medium, a heater core that radiates heat of the heating medium to air blown to a space to be air-conditioned, and a first heating medium pump that pumps the heating medium are connected so that the heating medium is allowed to circulate therethrough;
a low-temperature side heating medium circuit in which a radiator that radiates heat of the heating medium to outside air, a second heater generates heat in accordance with an operation and whose temperature is adjusted by heat of the heating medium, and a second heating medium pump that pumps the heating medium are connected so that the heating medium is allowed to circulate therethrough;
a device heating medium circuit in which a device heat exchanger exchanges heat between a target device to be subjected to temperature adjustment and the heating medium, the device heat exchanger being connected so that the heating medium is allowed to flow in and out, and a third heating medium pump that pumps the heating medium are connected so that the heating medium is allowed to circulate therethrough;
a circuit connection portion that connects the high-temperature side heating medium circuit, the low-temperature side heating medium circuit, and the device heating medium circuit so that the heating medium is allowed to flow in and out; and
a circuit switch switches a flow of the heating medium in the high-temperature side heating medium circuit, the low-temperature side heating medium circuit, the device heating medium circuit, and the circuit connection portion, wherein
the circuit switch switches between
an operation mode in which the heating medium that passed through the low-temperature side heating medium circuit is circulated through any one of the high-temperature side heating medium circuit and the device heating medium circuit via the circuit connection portion and
an operation mode in which the high-temperature side heating medium circuit, the low-temperature side heating medium circuit, and the device heating medium circuit are connected via the circuit connection portion, and the heating medium is circulated through the second heater, the device heat exchanger, the first heater, and the heater core, and
a circulation path of the heating medium in the operation mode in which the high-temperature side heating medium circuit, the low-temperature side heating medium circuit, and the device heating medium circuit are connected via the circuit connection portion, and the heating medium is circulated through the second heater, the device heat exchanger, the first heater, and the heater core is configured so that any one of the first heating medium pump, the second heating medium pump, and the third heating medium pump is disengaged.

* * * * *